United States Patent
Hano et al.

(10) Patent No.: US 7,676,319 B2
(45) Date of Patent: Mar. 9, 2010

(54) INTAKE AIR AMOUNT CONTROL APPARATUS FOR ENGINE AND CONTROL METHOD THEREOF

(75) Inventors: Masaki Hano, Isesaki (JP); Kenichi Machida, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 75 days.

(21) Appl. No.: 11/965,907

(22) Filed: Dec. 28, 2007

(65) Prior Publication Data

US 2009/0018754 A1 Jan. 15, 2009

(30) Foreign Application Priority Data

Dec. 28, 2006 (JP) .............................. 2006-355267
Dec. 20, 2007 (JP) .............................. 2007-329012

(51) Int. Cl.
*B60T 7/12* (2006.01)
*F02D 13/04* (2006.01)

(52) U.S. Cl. ........................ 701/103; 123/321; 123/345; 123/434

(58) Field of Classification Search .................. 701/101, 701/103; 123/321, 322, 345, 346, 347, 348, 123/434
See application file for complete search history.

(56) References Cited

U.S. PATENT DOCUMENTS 7,055,495 B2 * 6/2006 Yamaoka et al. ............ 123/305
7,213,569 B2 * 5/2007 Fuwa et al. .................. 123/345
7,331,317 B2 * 2/2008 Yasui et al. ............... 123/90.15
7,367,318 B2 * 5/2008 Moriya et al. ............... 123/435
7,451,754 B2 * 11/2008 Yasui et al. .................. 123/681
7,469,180 B2 * 12/2008 Yasui et al. .................. 701/105
2007/0113827 A1 * 5/2007 Moriya et al. ............... 123/435

FOREIGN PATENT DOCUMENTS

| JP | 2000-213663 | 8/2000 |
|----|-------------|--------|
| JP | 2001-173470 | 6/2001 |
| JP | 2001-182563 | 7/2001 |

* cited by examiner

*Primary Examiner*—John T Kwon
(74) *Attorney, Agent, or Firm*—Antonelli, Terry, Stout & Kraus, LLP.

(57) ABSTRACT

The present invention provides an intake air amount control apparatus for an engine and a control method of an intake air amount of an engine, in which, when the atmospheric pressure exceeds a threshold value, a target lift amount of an intake valve is determined based on a target intake air amount and an electronically controlled throttle is controlled to generate a target boost pressure. On the other hand, when the atmospheric pressure does not exceed the threshold value because of a vehicle traveling at a high altitude, the target lift amount of the intake valve is fixed to a maximum lift amount and the opening angle of the electronically controlled throttle is determined in response to the target intake air amount. Consequently, an actual intake air amount is controlled to be brought to the target intake air amount thereby generating negative pressure necessary for exhaust gas recirculation.

21 Claims, 19 Drawing Sheets

INTAKE AIR AMOUNT CONTROL APPARATUS FOR ENGINE AND CONTROL METHOD THEREOF

BACKGROUND OF THE INVENTION

1. Field of the Invention

The present invention relates to an intake air amount control apparatus for an engine, which is provided with a variable valve unit used for moving an intake valve while variably changing the opening characteristic of the intake valve, and an electronically controlled throttle disposed in an intake pipe on the upstream side of the intake valve. The present invention also relates to a control method of an intake air amount of an engine.

2. Description of the Related Art

Japanese Laid-open (Kokai) Patent Application Publication No. 2001-173470 discloses an engine control apparatus which is configured to control an angle of opening of an electronically controlled throttle (it will hereinafter be abbreviated as "opening angle of the electronically controlled throttle"), based on a target boost pressure of an engine and then controls a timing of closing (it will hereinafter be abbreviated as a closing timing) of the intake valve based on a target intake air amount.

The control apparatus operates so as to correct either the target intake air amount for calculating the closing timing of the intake valve or the closing timing of the intake valve, which has been calculated based on the target intake air amount, in response to the above-mentioned target boost pressure.

With this conventional engine control apparatus, as described above, when the opening angle of the electronically controlled throttle is feed-forward controlled based on the target boost pressure while controlling the closing timing of the intake valve based on the target intake air amount, if the atmospheric pressure changes, there will occur a difference between the actually obtained boost pressure and the target boost pressure.

On the other hand, as an alternative controlling method, if an absolute pressure sensor capable of detecting an absolute pressure of the boost pressure is employed, and if a boost pressure detected by the absolute pressure sensor is brought into coincidence with the target boost pressure by controlling the opening angle of the electronically controlled throttle in the feed-back control manner, it is possible to converge the boost pressure expressed by the absolute pressure to a pressure in the quite vicinity of the target boost pressure.

However, if the atmospheric pressure decreases, a pressure detected by the absolute pressure sensor also decreases. Consequently, control operation for increasing the opening angle of the electronically controlled throttle will be made, resulting in generation of a lesser differential pressure (a negative pressure) between the atmospheric pressure and a pressure appearing in the upstream side of the intake valve in response to such a decrease in the atmospheric pressure per se.

If the negative pressure (the differential pressure) is lessened due to a decrease in the atmospheric pressure as described above, all kinds of apparatus and mechanism utilizing the negative pressure (differential pressure) in the system of an intake pipe might fail to exhibit a prescribed operation and performance, thereby possibly worsening the exhaust emission from an engine or degrading a driving performance of the engine.

In addition, if reduction in the boost pressure is conducted by reducing the opening angle of the electronically controlled throttle for the purpose of preventing the negative pressure (the differential pressure) from lessening in response to the decrease in the atmospheric pressure, there arises a problem such that a difficulty is encountered in reliable acquirement of the target intake air amount.

SUMMARY OF THE INVENTION

Accordingly, a primary object of the present invention is to provide an engine intake air amount control apparatus and a control method capable of securing a required negative pressure and of reliably acquiring a target intake air amount even when a decrease in the atmospheric pressure takes place.

To achieve the above-described object, according to the present invention, controlling operation is performed in a manner such that when the atmospheric pressure exceeds a given threshold value, a variable valve unit is controlled so as to adjust an intake air amount of the engine to become a target intake air amount and on the other hand, when the atmospheric pressure is equal to or lower than the threshold value, the variable valve unit is controlled to become a state where the intake air amount of the engine is more increased rather larger than a different state where the opening characteristic of the intake valve is in compliance with a target intake air amount, while the electronically controlled throttle is controlled so that an intake air amount of the engine is adjusted to the target intake air amount.

The other objects and features of this invention will become understood from the following description with reference to the accompanying drawings.

DESCRIPTION OF THE PREFERRED EMBODIMENTS

Figure 1:
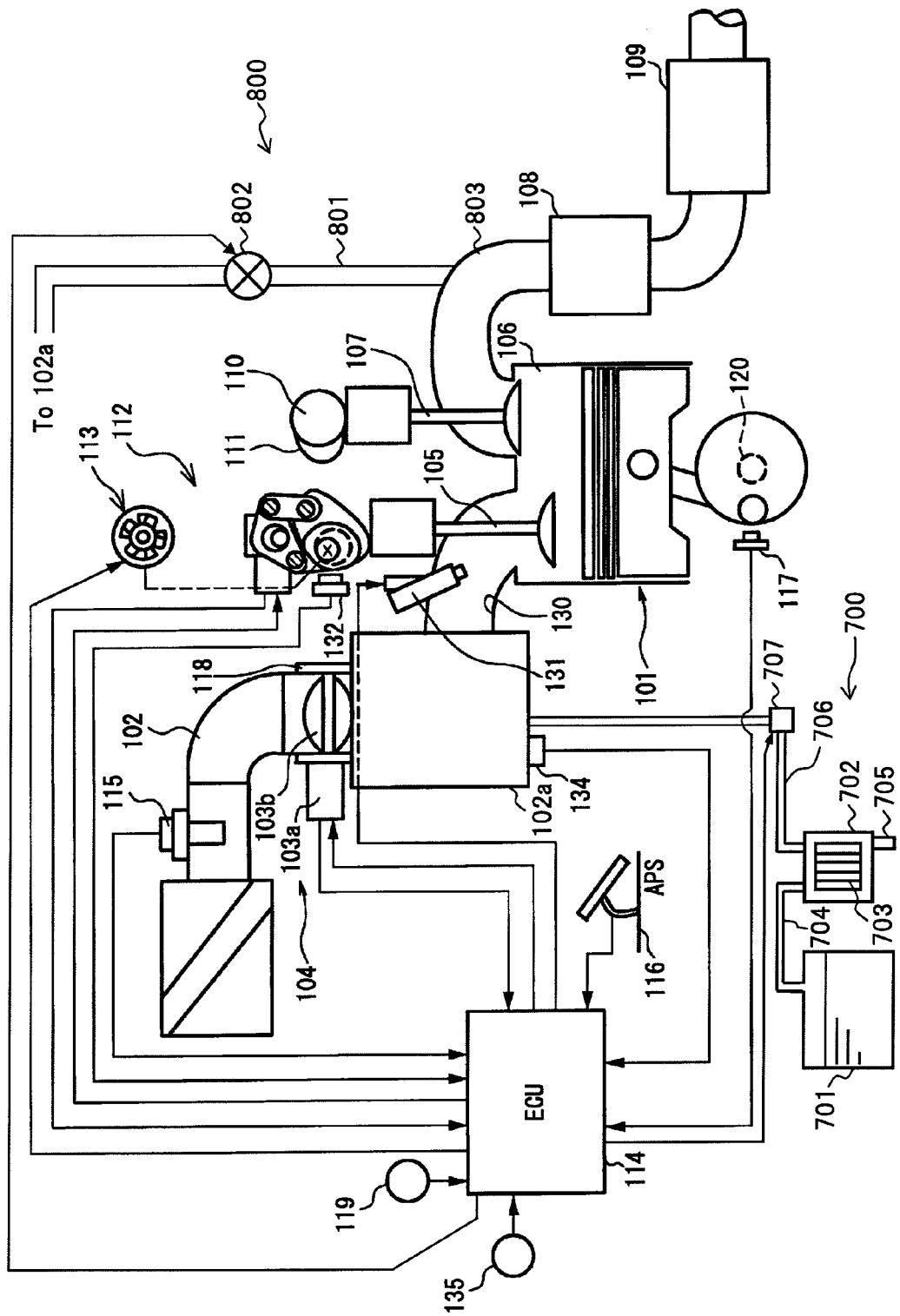
FIG. 1 is a diagrammatic view illustrating a general arrangement of a vehicle engine according to an embodiment of the present invention.

FIG. 1 is a diagrammatic view illustrating a general arrangement of a vehicle engine.

Referring to FIG. 1, there is shown an engine (gasoline internal combustion engine) 101 having an intake pipe 102 in which an electronically controlled throttle 104 is interposed.

Electronically controlled throttle 104 is a device which operates to open and close a throttle valve 103b by means of a throttle motor 103a.

Air entering into intake pipe 102 is taken into a combustion chamber 106 of engine 101 through electronically controlled throttle 104 and intake valve 105.

A fuel injection valve 131 is mounted so as to dispose its injection end in an intake port 130 on an upstream side of intake valve 105 of each cylinder.

Fuel injection valve 131 injects fuel (gasoline) with an amount proportional to an injection pulse width of an injection pulse signal sent from an engine control unit (ECU) 114.

Then, the fuel inside combustion chamber 106 introduced by virtue of suction effect is ignited and combusted by spark ignition performed by a spark plug (not shown).

Exhaust gas from engine 101 is exhausted from combustion chamber 106 through an exhaust valve 107, and is purified by a front catalyst converter 108 and a rear catalyst converter 109. Then, the purified gas is discharged into the atmosphere.

Exhaust valve 107 is opened and closed by a cam 111 mounted on an exhaust cam shaft 110 so as to constantly maintain a predesigned valve lift amount, operation angle and valve timing.

On the other hand, intake valve 105 is controlled in its valve lift amount, operation angle and valve timing to be variable by later-described a variable valve unit.

In the illustrated embodiment, the variable valve unit includes a variable lift mechanism 112 which continuously changes valve lift amount and the operation angle of intake valve 105, and a variable valve timing mechanism 113 which continuously changes the phase of the center of (it will hereinafter be abbreviated as a center phase) the operation angle of intake valve 105 by changing the phase of an intake drive shaft with respect to a crank shaft.

Figure 2:
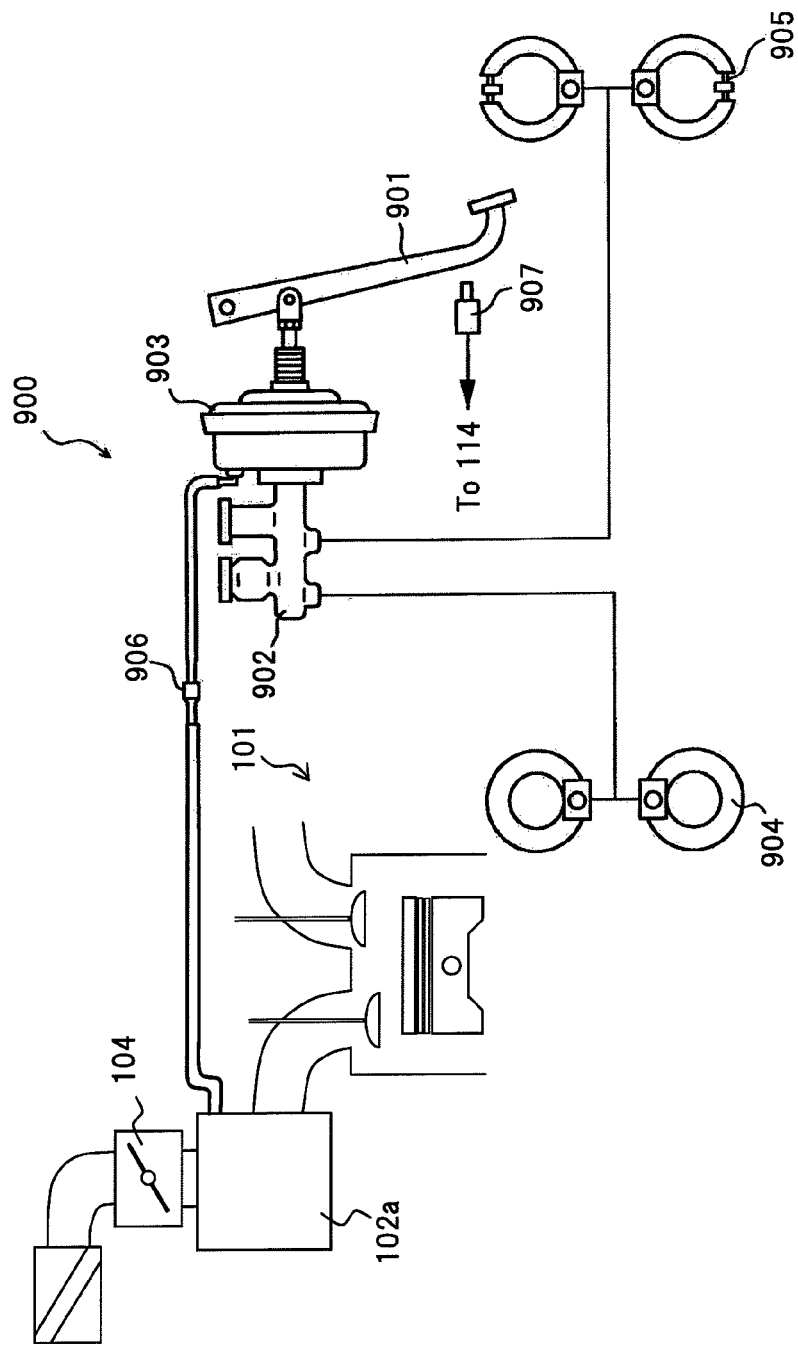
FIG. 2 is a diagrammatic view illustrating a general arrangement of a direct acting vacuum servo brake according to an embodiment of the present invention.

Referring further to the arrangement of engine 101 shown in FIG. 1 together with that shown in FIG. 2, there are provided a fuel vapor processing unit 700 and an exhaust gas recirculation system 800, and in a vehicle on which engine 101 is mounted, there is provided a direct acting vacuum servo brake 900 (FIG. 2).

Fuel vapor processing unit 700 is a device which adsorbs a fuel vapor generating in a fuel tank 701 to a canister 702 and supplies the fuel vapor desorbed from canister 702 into engine 101.

Canister 702 is formed by filling an air-tight container with an adsorbent 703, such as an activated carbon, and is connected with an introducing pipe 704 which is arranged to extend from fuel tank 701.

The fuel vapor generating in fuel tank 701 is introduced into canister 702 through introducing pipe 704, and then adsorbed to adsorbent 701.

Further, canister 702 is provided with a fresh air introducing port 705 formed therein, and a purge piping 706 arranged to extend therefrom.

Purge piping 706 is connected to an intake collector 102a which is disposed on a downstream side of electronically controlled throttle 104 via a purge control valve 707, which is interposed in purge piping 706 to be controlled by a control signal outputted from engine control unit 114.

In above-mentioned fuel vapor processing unit 700, when purge control valve 707 is controlled to be opened, an intake negative pressure of engine 101 acts on canister 702. Then, by an air which is introduced via fresh air introducing port 705, the fuel vapor adsorbed by adsorbent 703 is desorbed therefrom, and a purge air containing therein fuel vapor component is introduced through purge piping 706 into intake collector 102a.

Above-mentioned exhaust gas recirculation system 800 comprises an exhaust gas recirculating passage 801 and an exhaust gas recirculating control valve 802.

Exhaust gas recirculating passage 801 is a passage which connects an exhaust pipe 803 and intake collector 102a with each other. In exhaust gas recirculating passage 801, exhaust gas recirculating control valve 802 is interposed.

Exhaust gas recirculating control valve 802 is controlled by a control signal outputted from engine control unit 114. When exhaust gas recirculating control valve 802 is controlled to be opened, an exhaust gas is taken into intake collector 102a by virtue of the negative pressure inside intake collector 102a.

Direct acting vacuum servo brake 900 shown in FIG. 2 is a braking system which is configured to utilize the intake negative pressure of engine 101 as a negative pressure for boosting a force as detailed below.

As best shown in FIG. 2, between a brake pedal 901 and a master cylinder 902, there is disposed a servo unit 903. Servo unit 903 boosts a pressing force applied on brake pedal 901 by a foot and an increased force by boosting acts on a piston of master cylinder 902.

Master cylinder 902 is a device by which a control force increased by servo unit 903 is converted into an oil pressure of brake. The oil pressure of brake is distributed and supplied to a front brake 904 and a rear break 905.

In servo unit 903, the negative pressure inside intake collector 102a of engine 101 prevails via a check valve 906.

On brake pedal 901, there is disposed a brake switch 907 which is configured to be turned on when brake pedal 901 is pressed on. An on/off signal of brake switch 907 is arranged to be inputted into engine control unit 114.

Engine control unit 114 incorporating therein a micro computer, sets fuel injection amount, ignition timing, target intake air amount and target boost pressure by arithmetic operation conducted based on a preliminarily memorized program, and further computes and outputs control signals to fuel injection valve 131, a power transistor for ignition coil, electronically controlled throttle 104, variable lift mechanism 112 and variable valve timing mechanism 113.

Signals from various sensors are inputted to engine control unit 114.

As the various sensors, there are provided an air flow sensor 115 for detecting intake air amount of engine 101, an accelerator opening angle sensor 116 for detecting a depression amount of an accelerator pedal operated by a vehicle driver, a crank angle sensor 117 for outputting a crank angle signal for each reference angle of a crank shaft 120, a throttle sensor 118 for detecting an opening angle TVO of throttle valve 103b, a water temperature sensor 119 for detecting the temperature of cooling water in engine 101, a cam sensor 132 for outputting a cam signal for each reference angle of intake drive shaft 3 described later, a boost pressure sensor 134 for detecting a pressure (boost pressure) in intake pipe 102 in the downstream of throttle valve 103b and in the upstream of intake valve 105 and an atmospheric pressure sensor 135 for detecting the atmospheric pressure etc.

Boost pressure sensor 134 may be comprised of either an absolute pressure sensor, or a gauge pressure sensor capable of detecting a pressure difference relative to the atmospheric pressure.

Figure 3:
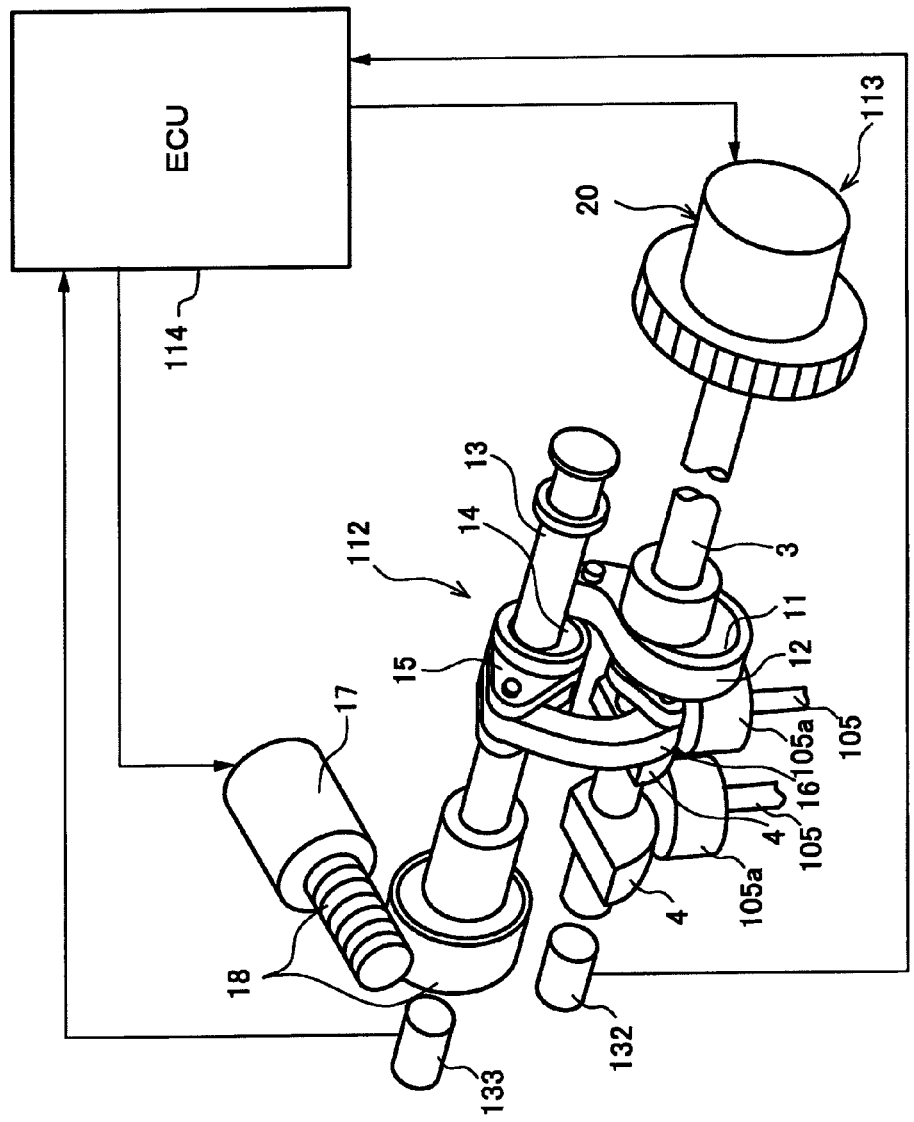
FIG. 3 is a perspective view, in part block diagram, of a variable valve unit incorporated in the vehicle engine according to the embodiment of the present invention.

FIG. 3 is a schematic perspective view illustrating variable lift mechanism 112.

In engine 101, a pair of intake valves 105 is provided in each cylinder and intake drive shaft 3 which is rotated by crank shaft 120 (FIG. 1) is rotatably supported at a position above respective intake valves 105.

Onto the outer surface of intake drive shaft 3, an oscillating cam 4 is relatively rotatably fitted so as to open and close intake valve 105 through abutment thereof against a valve lifter 105a of intake valve 105.

Between intake drive shaft 3 and oscillating cam 4, variable lift mechanism 112 is provided for continuously changing the operation angle and the valve lift amount of intake valve 105.

At an end portion of the same intake drive shaft 3, variable valve timing mechanism 113 is disposed for continuously changing the center phase of the operation angle of intake valve 105 by changing the rotary phase of intake drive shaft 3 with respect to crank shaft 120.

Figure 4:
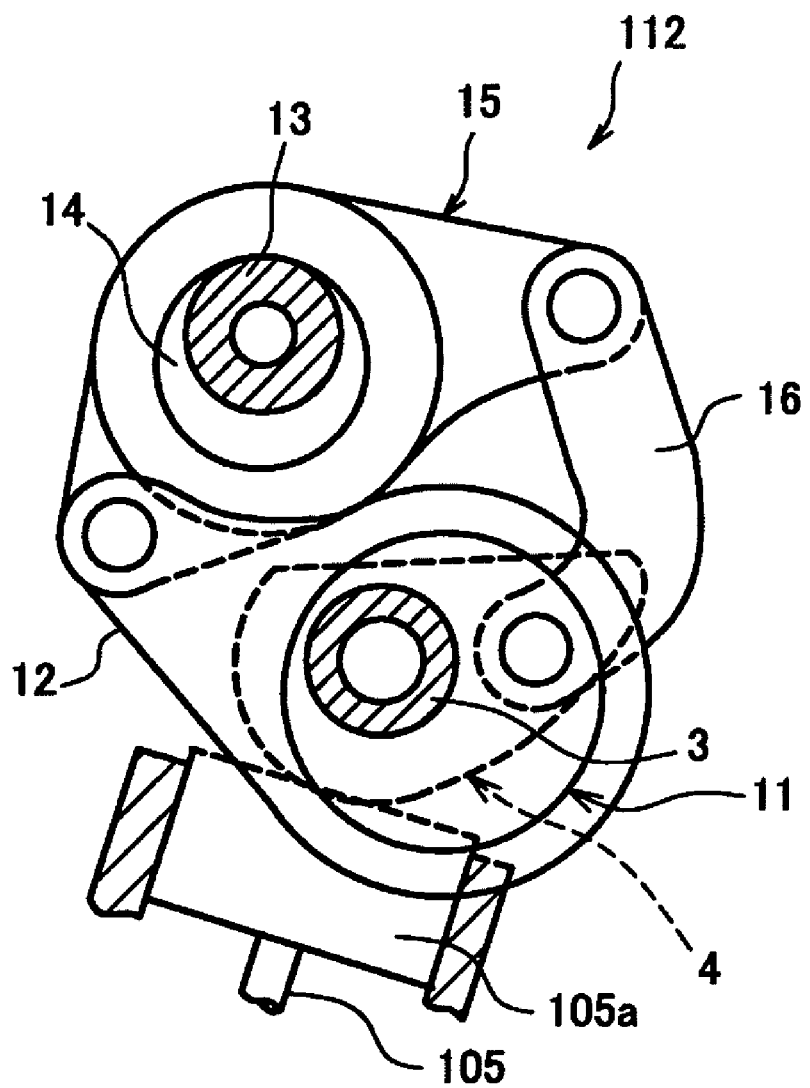
FIG. 4 is a cross-sectional and diagrammatic view of a variable lift mechanism according to the embodiment of the present invention.

As shown in FIGS. 3 and 4, variable lift mechanism 112 comprises a circular drive cam 11 provided for being fixedly and eccentrically mounted on intake drive shaft 3, a ring-like link 12 rotatably fitted on the outer surface of drive cam 11, a control shaft 13 extending substantially parallel to intake drive shaft 3 in a direction in which a row of cylinders are arranged, a circular control cam 14 provided eccentrically and fixedly on control shaft 13, a rocker arm 15 rotatably fitted on the outer surface of the control cam 14, and having one end thereof which is connected to the front end of ring-like link 12, and a rod-like link 16 connected to both the other end of lock arm 15 and oscillating cam 4.

Control shaft 13 is rotated by motor 17 via a gear train 18 through an angle within a specified angular range.

Under the above-described structure of the variable valve unit, when intake drive shaft 3 is rotated in association with the rotation of crank shaft 120, ring-like link 12 is moved to carry out a substantial translational movement thereof via the drive cam 11 and thus, locker arm 15 carries out an oscillatory motion thereof around the axis of control cam 14, so that oscillating cam 4 is oscillated via rod-like link 16 so as to open and close intake valve 105.

Further, by rotating control shaft 13 so as to change an angle position thereof by motor 17, the axis position of control cam 14 which is an oscillating center of locker arm 15 is changed so as to vary the posture of oscillating cam 4.

Consequently, with the center phase of the operation angle of intake valve 105 kept substantially constant, the operation angle and valve lift amount of intake valve 105 are continuously changed.

Engine control unit 114 receives, at its one input, a detection signal from angle sensor 133 that detects the angle of control shaft 13 and performs a feed-back control of a supply of electric power to motor 17, based on a result of detection of angle sensor 133 in order to rotate control shaft 13 to a target angle position corresponding to a target valve lift amount (a target operation angle).

Figure 5:
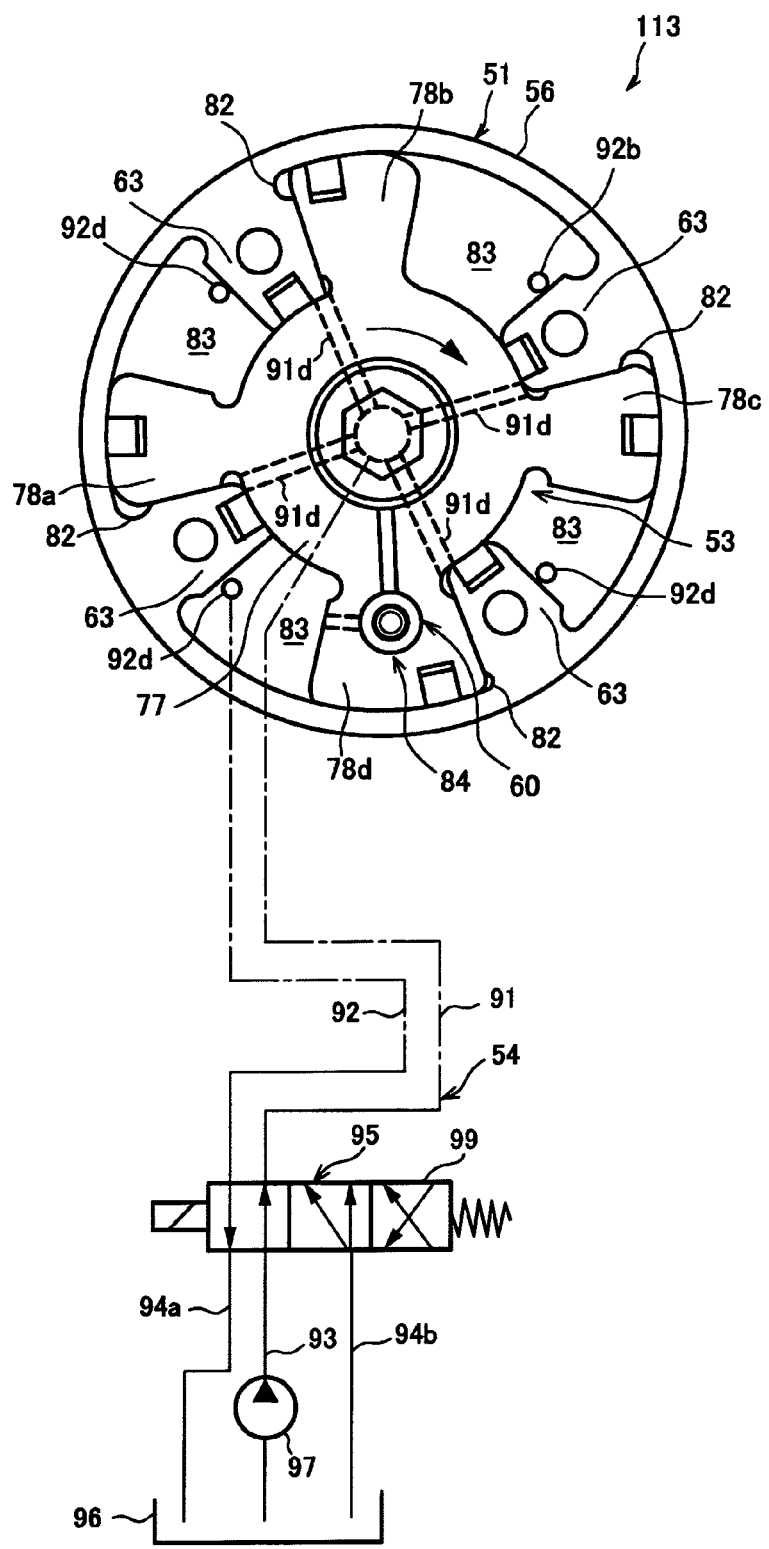
FIG. 5 is a diagrammatic view of a variable valve timing mechanism according to the embodiment of the present invention.

FIG. 5 shows variable valve timing mechanism 113.

Variable valve timing mechanism 113 comprises a cam sprocket 51 (timing sprocket) which is driven by crank shaft 120 via a timing chain, a rotary member 53 which is fixed to an end portion of intake drive shaft 3 and rotatably accommodated within cam sprocket 51, a hydraulic circuit 54 for rotating rotary member 53 relative to cam sprocket 51, and a locking mechanism 60 for selectively locking a relative rotation position between cam sprocket 51 and rotary member 53 at a reference position.

Cam sprocket 51 is comprised of a rotating portion (not shown) having a toothed portion formed in an outer periphery thereof, which meshes with a timing chain (or timing belt), a housing 56 which is disposed in front of the rotating portion and rotatably accommodates the rotating member, and a front cover and rear cover (not shown) for closing the front and rear openings of housing 56.

Housing 56 is formed in the shape of a cylinder having openings at its front and rear opposite ends. On an inner peripheral surface of housing 56, there are provided four radially projected partition walls 63 of trapezoidal cross-section, respectively, and arranged equiangularly at every 90° in a circumferential direction while being extended in a direction along the axis of housing 56, respectively.

Rotary member 53 is fixed to the front-end portion of intake drive shaft 3 and is provided with four vanes 78a, 78b, 78c, and 78d provided on the outer peripheral surface of a toric base portion 77 to be spaced apart from one another at every 90°.

Each of first through fourth vanes 78a to 78d has a substantially inverted trapezoidal section and is disposed in a concave portion between respective partition wall portions 63, defining the concave portion forward and backward in the rotation direction, so that an advance angle side hydraulic chamber 82 and a retarded angle side hydraulic chamber 83 are defined between sides of each of the vanes 78a to 78d and sides of each partition wall 63, respectively.

Lock mechanism 60 allows a lock pin 84 to be inserted into an engagement hole (not shown) at a rotation position (reference position) on a maximum retarded angle side of rotary member 53.

Hydraulic circuit 54 includes two systems of hydraulic passages, that is, a first hydraulic passage 91 for supplying/discharging hydraulic pressure to advance angle side hydraulic chamber 82 and a second hydraulic passage 92 for supplying/discharging hydraulic pressure to retarded angle side hydraulic chamber 83. A supply passage 93 and drain passages 94a, 94b are connected to both hydraulic passages 91, 92 through an electromagnetic switching valve 95 operative to carry out switching of the hydraulic passages.

In supply passage 93, an engine-driven oil pump 97 for feeding oil from an oil pan 96 by pressure is provided, while the downstream ends of respective drain passages 94a, 94b extend to fluidly communicate with an inside of oil pan 96.

First hydraulic passage 91 is connected to four branch passages 91d, which are formed substantially radiantly within base portion 77 of rotary member 53 and establish a fluid communication with each advance angle side hydraulic chamber 82. Second hydraulic passage 92 is connected to four oil holes 92d, which are opened in each retarded angle side hydraulic chamber 83.

In electromagnetic switching valve 95, there is provided an internal spool valve body, which controls switching of fluid communication of two hydraulic passages 91 and 92 with supply passage 93 and drain passages 94a, 94b on the side of oil pan 96.

Engine control unit 114 controls an amount of electricity, i.e., an amount of electric power, supplied to an electromagnetic actuator 99 which drives electromagnetic switching valve 95 based on duty signals on which a dither signal is superposed.

For example, if control signal (OFF signal) having a duty ratio 0% is outputted to electromagnetic actuator 99, hydraulic oil fed from oil pump 97 is supplied to retarded angle side hydraulic chamber 83 through second hydraulic chamber 92 and hydraulic oil in advance angle side hydraulic chamber 82 is discharged into oil pan 96 from first drain passage 94a through first hydraulic passage 91.

Therefore, the internal pressure of retarded angle side hydraulic chamber 83 increases, and simultaneously the internal pressure of advance angle side hydraulic chamber 82 decreases, so that rotary member 53 is rotated to the maximum retarded angle side via vanes 78a through 78b. Consequently, the opening period (the center phase of valve operation angle) of intake valve 105 is retarded.

On the other hand, if a control signal (ON signal) having a duty ratio 100% is outputted to electromagnetic actuator 99, hydraulic oil is supplied into advance angle side hydraulic chamber 82 through first hydraulic passage 91 while hydraulic oil in retarded angle side hydraulic chamber 83 is discharged into oil pan 96 through second hydraulic passage 92 and second drain passage 94b, so that the pressure of retarded angle side hydraulic chamber 83 decreases.

Consequently, rotary member 53 is rotated most to advance angle side via vanes 78a to 78d and as a result, the opening period (the center phase of valve operation angle) of intake valve 105 is made earlier i.e., advanced.

It is to be understood that mechanism for continuously varying the operation angle/valve lift amount of intake valve 105 and mechanism of continuously varying the center phase of valve operation angle of intake valve 105 are not restricted to the ones shown in FIGS. 3 through 5.

Further, the apparatus which allows the opening characteristic of intake valve 105 to be varied is not restricted to combinations of variable lift mechanism 112 and variable valve timing mechanism 113, but it may be permissible to adopt an apparatus using a solid cam as disclosed in Japanese Kokai (Laid-open) Patent Application Publication No. 2001-182563 or an apparatus in which engine valve is opened and closed by the employment of an electromagnet as disclosed in Japanese Kokai (Laid-open) Patent Application Publication No. 2000-213663.

Next, control routine of electronically controlled throttle 104, variable lift mechanism 112 and variable valve timing mechanism 113 with engine control unit 114 will be hereinafter described in detail.

Figure 6:
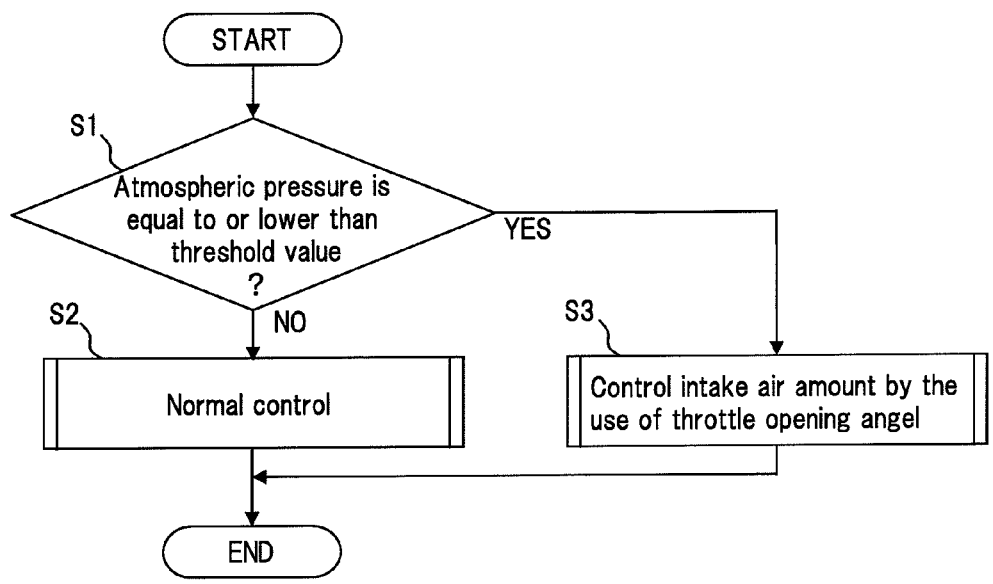
FIG. 6 is a flowchart of a main routine of intake air amount control according to the embodiment of the present invention.

The flowchart of FIG. 6 shows a main routine of the controlling operation.

In step S1, whether or not vehicle is operated under atmospheric pressure lower than standard atmospheric pressure is determined by determining whether or not atmospheric pressure detected by atmospheric pressure sensor 135 is equal to or lower than a preset threshold value.

Instead of actually detecting the atmospheric pressure, the atmospheric pressure may be estimated from a current altitude of a traveling position of a vehicle or may be obtained based on information provided through a suitable communication circuit or network from the outside.

If it is determined that atmospheric pressure is over the threshold value, the procedure proceeds to step S2, in which electronically controlled throttle 104, variable lift mechanism 112 and variable valve timing mechanism 113 are subjected to a normal control.

As regards the above-mentioned normal control, an opening characteristic of intake valve 105 is adjustably changed by variable lift mechanism 112 and variable valve timing mechanism 113 so that an actual intake air amount is adjusted to become a target intake air amount to thereby generate a target torque, while electronically controlled throttle 104 is also controlled in order to generate a negative pressure as an operation source for fuel vapor processing unit 700 which purges the fuel vapor from canister 702 by virtue of the negative pressure, exhaust gas recirculation system 800 which recirculates the exhaust gas into the intake pipe by virtue of the negative pressure or direct acting vacuum servo brake 900 which boosts the pressing force by virtue of the negative pressure.

That is, in the normal control, electronically controlled throttle 104 is basically opened fully, and when it is necessary to generate a negative pressure, the opening angle of electronically controlled throttle 104 is lessened, so that the actual intake air amount is adjusted to the level of the target intake air amount by controlling the opening characteristic of intake valve 105.

The detail of the normal control will be described according to flowcharts of FIGS. 7 through 9.

Figure 7:
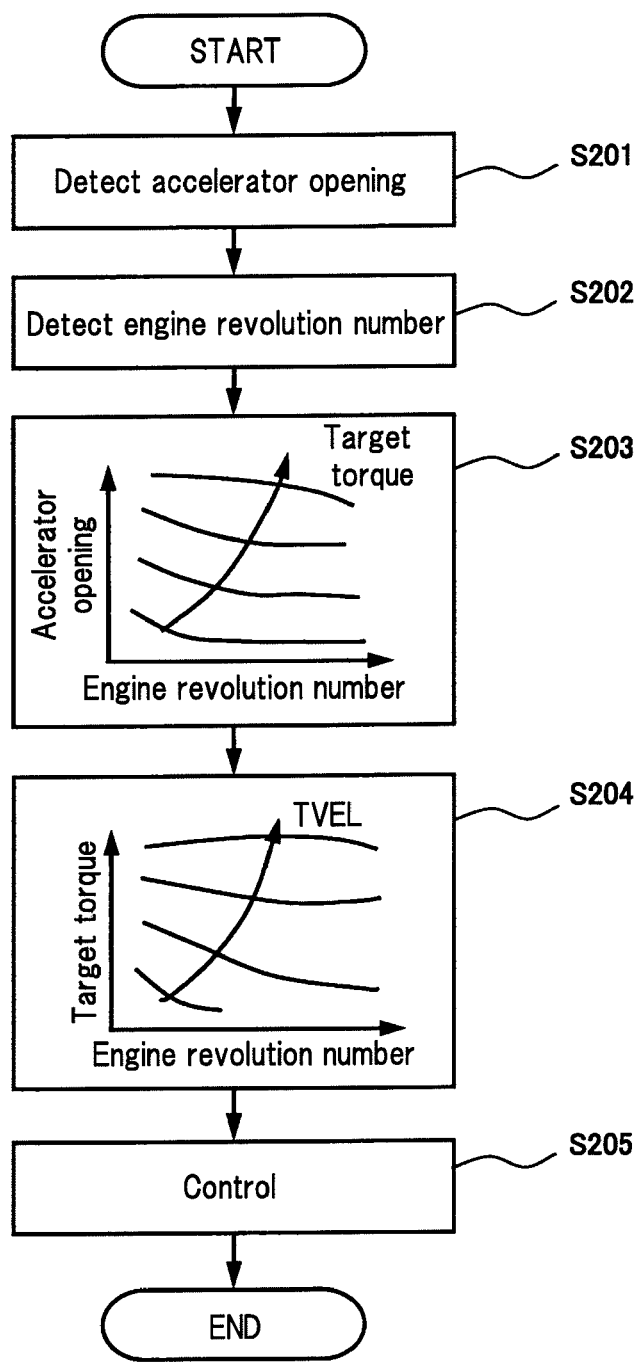
FIG. 7 is a flowchart of control routine of the variable lift mechanism under conditions in which the atmospheric pressure exceeds a threshold value according to the embodiment of the present invention.

FIG. 7 shows a normal control of variable lift mechanism 112.

In step S201, accelerator opening angle is detected based on output signal of accelerator opening angle sensor 116.

In step S202, engine revolution number NE (rpm) is detected based on output signal of crank angle sensor 117.

In step S203, referring is made to a map which beforehand stores target torque represented by the accelerator opening angle and the engine revolution number NE as variables, to retrieve a target torque (target intake air amount) corresponding to the accelerator opening angle and the engine revolution number NE at a given time.

In next step S204, referring is made to map which beforehand stores target lift amount TVEL (target angle of control shaft 13) represented by target torque and engine revolution number NE as variables, to retrieve target lift amount TVEL corresponding to both target torque obtained in step S203 and engine revolution number at that time.

In step S205, variable lift mechanism 112 is controlled based on the target lift amount TVEL.

Figure 8:
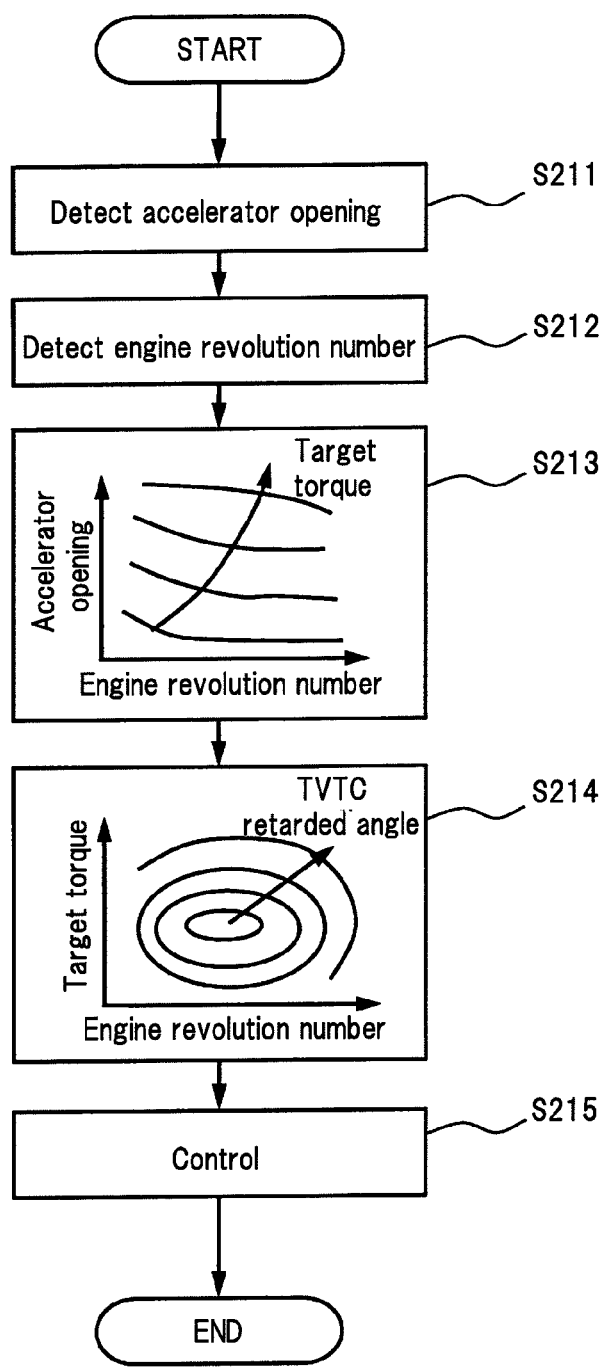
FIG. 8 is a flowchart of control routine of the variable valve timing mechanism under conditions in which the atmospheric pressure exceeds a threshold value according to the embodiment of the present invention.

Flowchart of FIG. 8 shows the normal control of variable valve timing mechanism 113.

In step S211, an angle of accelerator opening (it will hereinafter be abbreviated as "accelerator opening angle of accelerator") is detected based on output signal of accelerator opening angle sensor 116.

In step S212, engine revolution number NE (rpm) is detected based on output signal of crank angle sensor 117.

Then, in step S213, referring is made to map which beforehand stores a target torque (a target intake air amount) represented by the accelerator opening angle and the engine revolution number NE used as variables, to retrieve a target torque corresponding to accelerator opening angle and engine revolution number NE at the given time.

In next step S214, referring is made to a map which beforehand stores target advance angle amount TVTC of center phase of valve operation angle represented by target torque and engine revolution number NE used as variables, to retrieve target advance angle amount TVTC corresponding to both the target torque obtained in step S213 and engine revolution number NE at that time.

The target advance angle amount TVTC indicates an advancing degree of valve timing of intake valve 105 from a reference position, which is set as a position where the valve timing of intake valve 105 is shifted to the most retard state.

Here, target lift amount TVEL and target advance angle amount TVTC are set as values which enables target torque (target intake air amount) to be achieved on a premise that they are controlled to be adjusted to target boost pressure at that time under each operation condition.

In step S215, variable valve timing mechanism 113 is controlled based on target advance angle amount TVTC.

Figure 9:
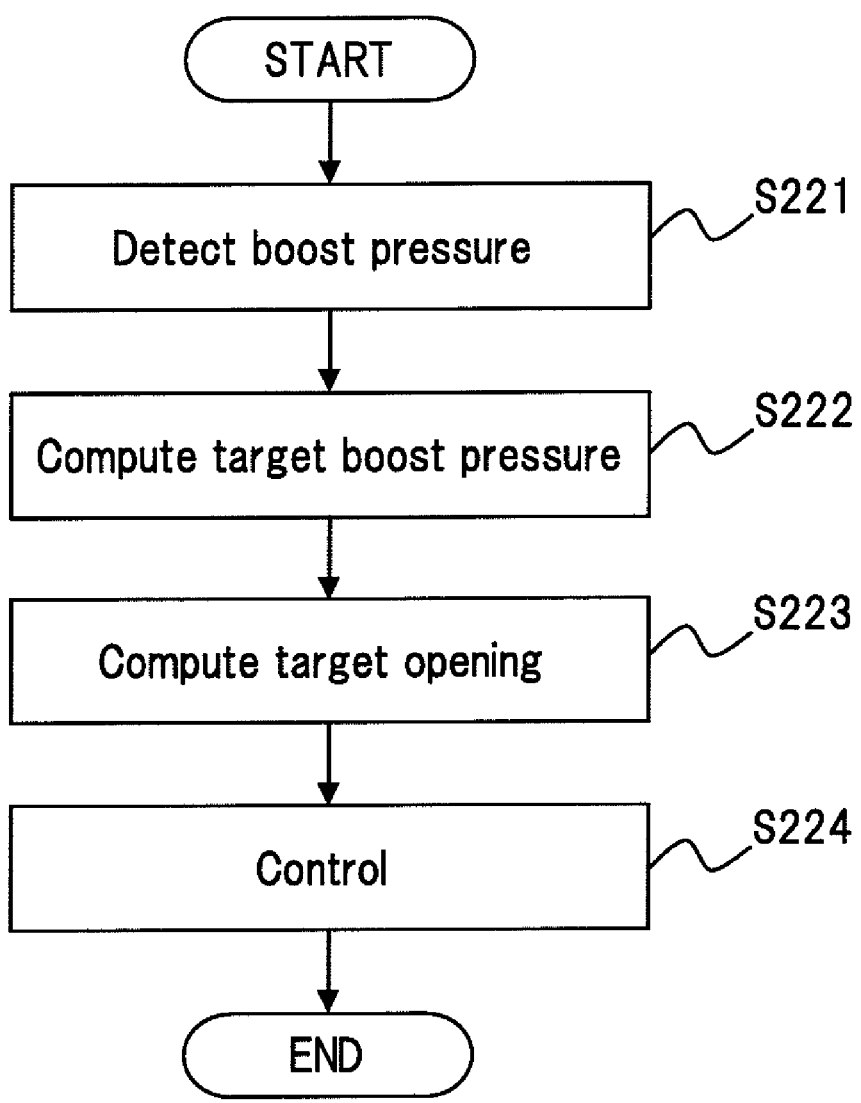
FIG. 9 is a flowchart of control routine of the electronically controlled throttle under conditions in which the atmospheric pressure exceeds a threshold value according to the embodiment of the present invention.

Flowchart of FIG. 9 indicates the normal control of electronically controlled throttle 104.

In step S221, boost pressure is detected based on output signal of boost pressure sensor 134.

In step S222, a target boost pressure is determined corresponding to a target torque and engine revolution number NE.

In step S223, a target opening angle of electronically controlled throttle 104 is computed so as to allow the boost pressure actually detected by boost pressure sensor 134 to come vicinity to the target boost pressure.

In step S224, electronically controlled throttle 104 is controlled based on the target opening angle.

When it is determined that atmospheric pressure exceeds a preset threshold value, target torque (target intake air amount) is obtained by controlling the opening characteristic of intake valve 105 by variable lift mechanism 112 and variable valve timing mechanism 113 while target boost pressure necessary for operating fuel vapor processing unit 700, exhaust gas recirculation system 800, direct acting vacuum servo brake 900 and the like, is generated by controlling electronically controlled throttle 104.

Figure 10:
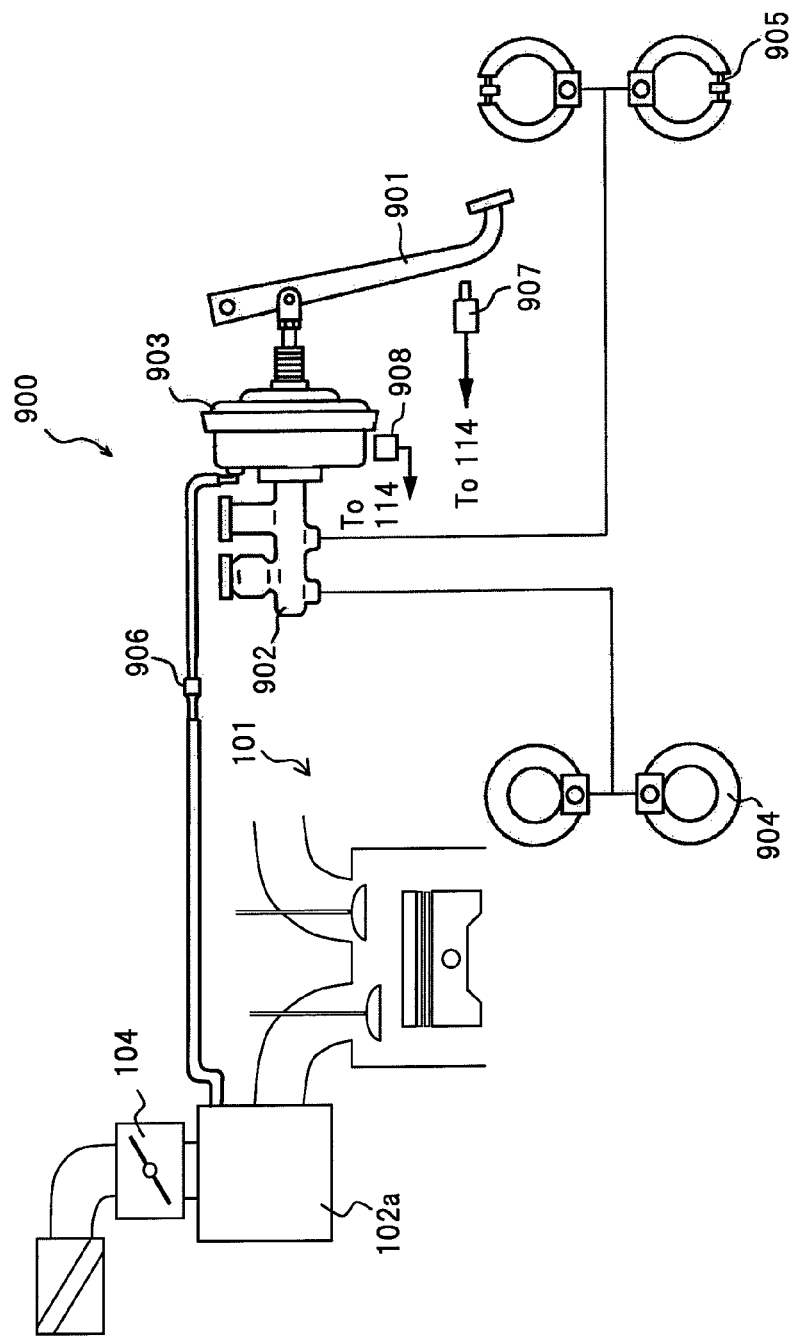
FIG. 10 is a diagrammatic view illustrating a general arrangement of a direct acting vacuum servo brake provided with a negative pressure sensor, according to an embodiment of the present invention.

As shown in FIG. 10, by providing the above-mentioned direct acting vacuum servo brake 900 with a negative pressure sensor 908 that detects a pressure inside a negative pressure chamber of servo unit 903 of direct acting vacuum servo brake 900, a target boost pressure can be calculated based on the target torque, the engine revolution number NE and the negative pressure detected by negative pressure sensor 908, and then based on the obtained target boost pressure, target opening angle of electronically controlled throttle 104 can be computed.

Further, the target boost pressure calculated based on the target torque and the engine revolution number NE, or the target opening angle calculated based on the target boost pressure can be corrected based on the negative pressure detected by negative pressure sensor 908.

By correcting the target opening angle of electronically controlled throttle 104 based on the negative pressure detected by negative pressure sensor 908 as mentioned above, it is possible to control the negative pressure to a pressure required by direct acting vacuum servo brake 900, with high accuracy.

On the other hand, if it is determined that atmospheric pressure detected by atmospheric pressure sensor 135 is equal to or lower than threshold value in step S1 of the main routine shown in FIG. 6, the procedure proceeds to step S3, in which the control routine is switched to a control routine which enables the target torque (target intake air amount) to be achieved by controlling electronically controlled throttle 104.

That is, if the atmospheric pressure is reduced to equal to or lower than the threshold value because of a vehicle traveling at a high altitude, the opening characteristic of intake valve 105 is corrected so as to increase the intake air amount larger than at normal control time, and to permit a target torque (a target intake air amount) to be achieved by reducing the opening of electronically controlled throttle 104. By reducing the opening angle of electronically controlled throttle 104, negative pressure necessary for operating fuel vapor processing unit 700, exhaust gas recirculation system 800, direct acting vacuum servo brake 900 and the like can be generated.

The detail of control under a lower atmospheric pressure will be described according to flowcharts of FIGS. 11 through 13.

Figure 11:
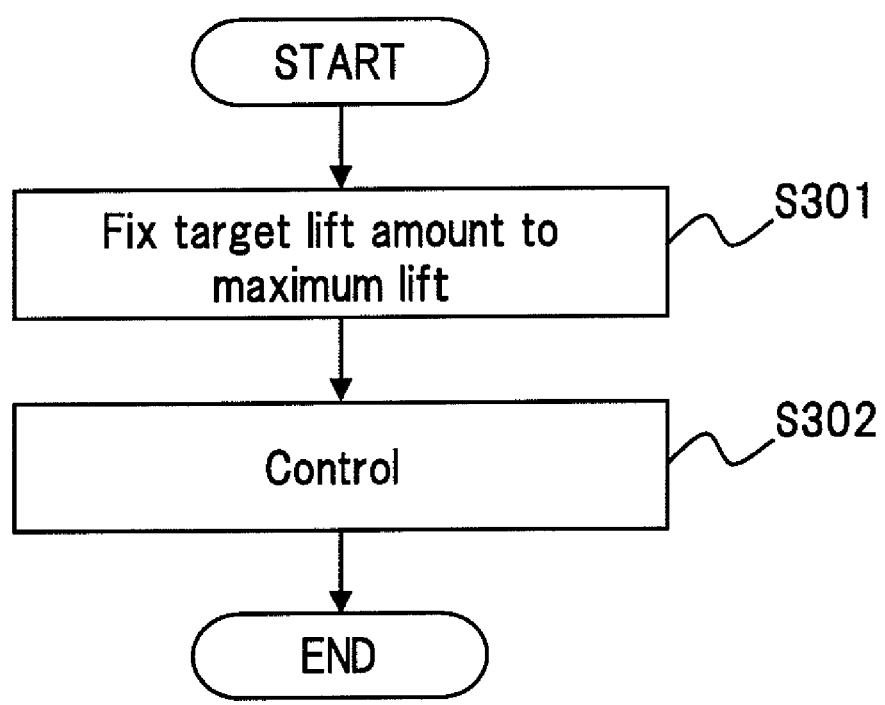
FIG. 11 is a flowchart of a first embodiment of control routine of the variable lift mechanism under conditions in which the atmospheric pressure is equal to or lower than a threshold value, according to the present invention.

The flowchart of FIG. 11 shows a control routine when the variable lift mechanism 112 is controlled during a low atmospheric pressure.

In step S301, the target lift amount TVEL is fixed to the maximum lift amount.

In normal control in the case where atmospheric pressure is over the threshold value, valve lift amount and operation angle of intake valve 105 is changed corresponding to the target torque (target intake air amount), on the other hand, in the case where the atmospheric pressure is equal to or lower than the threshold value, they are fixed to maximum valve lift amount/maximum operation angle, which are larger than those at the normal control time.

In step S302, variable lift mechanism 112 is controlled based on a target lift amount TVEL and valve lift amount and operation angle of intake valve 105 are fixed to the maximum valve lift amount and the maximum operation angel in variable lift mechanism 112.

Figure 12:
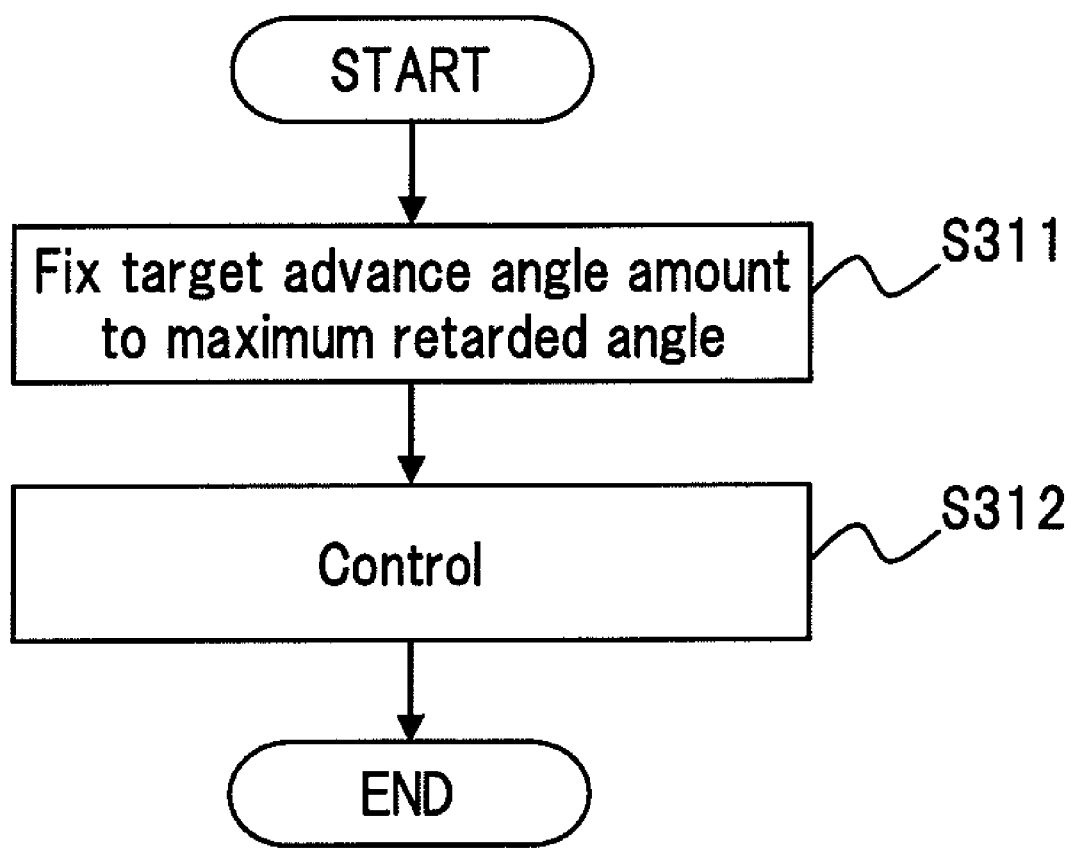
FIG. 12 is a flowchart of the first embodiment of control routine of the variable valve timing mechanism under conditions in which the atmospheric pressure is equal to or lower than the threshold value, according to the present invention.

The flowchart of FIG. 12 shows control routine when variable valve timing mechanism 113 is controlled during a low atmospheric pressure.

In step S311, target advance angle amount TVTC is set to a maximum retarded angle.

In step S312, variable valve timing mechanism 113 is controlled based on the target advance angle amount TVTC and the center phase of operation angle of intake valve 105 is fixed to the maximum retarded angle position in variable valve timing mechanism 113.

Intake valve 105 is set to the maximum valve lift amount and the maximum operation angle and the center phase of operation angle is fixed to the maximum retarded angle by the control of variable lift mechanism 112 and variable valve timing mechanism 113.

The operating condition of intake valve 105 substantially corresponds to a condition in which opening and closing of intake valve 105 are driven by a cam having a specified cam profile and no variable lift mechanism 112 or variable valve timing mechanism 113 is equipped.

In such an engine that does not have above-mentioned variable lift mechanism 112 and variable valve timing mechanism 113, intake air amount is not lessened by intake valve 105 but lessened by the throttle valve, so that the negative pressure can be easily generated.

Preferably, when an opening characteristic of intake valve 105 in the condition of the maximum valve lift amount and the maximum operation angle in variable lift mechanism 112 and/or in the condition of the maximum retarded angle of variable valve timing mechanism 113 is different from a normal opening characteristic of intake valve 105 of the engine which does not have variable lift mechanism 112 and variable valve timing mechanism 113, variable lift mechanism 112 and variable valve timing mechanism 113 may be controlled so that the opening characteristic of intake valve 105 is adjusted to be the normal opening characteristic.

Therefore, an amount to which the valve lift amount is fixed is not limited to the maximum valve lift amount, but any valve lift amount which does not substantially lessen the intake air amount may be employed.

A target for controlling variable valve timing mechanism 113 at a low atmospheric pressure is not limited to the maximum retarded angle but a preliminarily memorized advance angle amount between the maximum advance and retarded angle positions may be employed.

Figure 13:
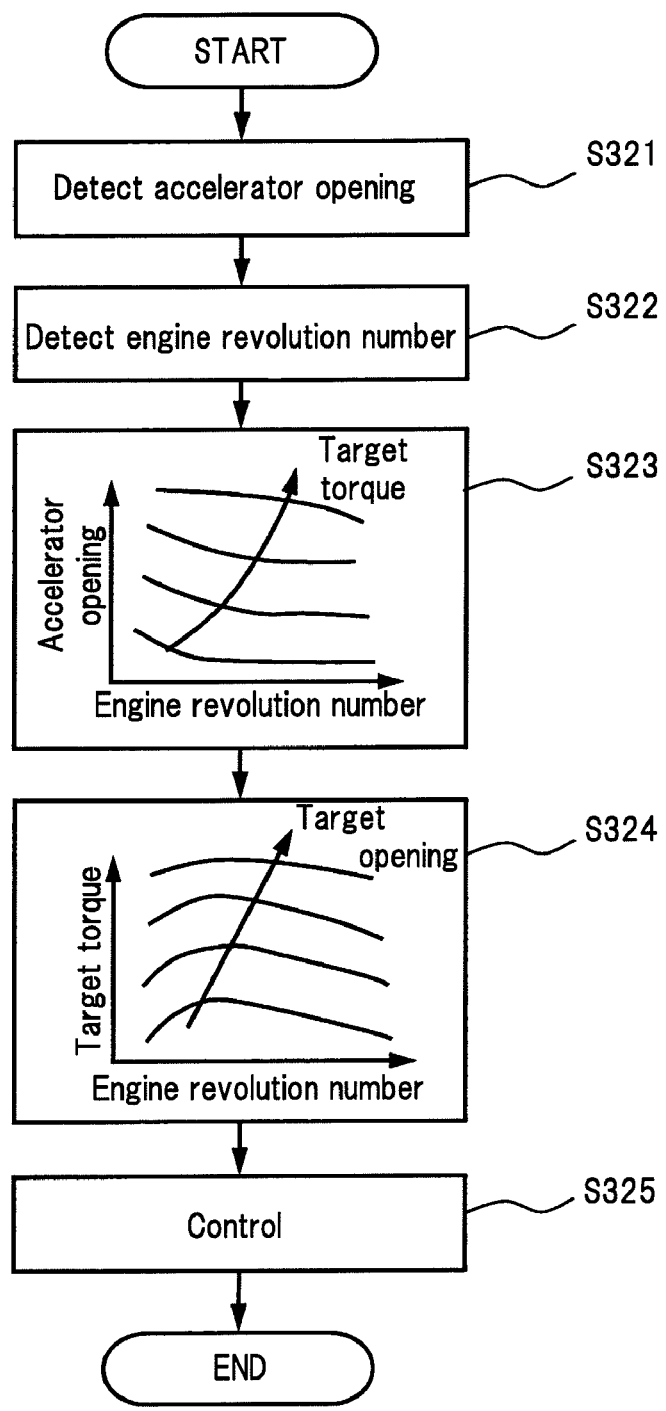
FIG. 13 is a flowchart of the first embodiment of control routine of the electronically controlled throttle under conditions in which the atmospheric pressure is equal to or lower than the threshold value, according to the present invention.

The flowchart of FIG. 13 shows control routine when electronically controlled throttle 104 is controlled during a low atmospheric pressure.

In step S321, an accelerator opening angle is detected according to output signal of accelerator opening angle sensor 116.

In step S322, engine revolution number NE (rpm) is detected based on output signal of crank angle sensor 117.

In step S323, referring is made to a map which beforehand stores a target torque (a target intake air amount) represented by the accelerator opening angle and the engine revolution number NE used as variables, to retrieve the target torque (the target intake air amount) corresponding to the accelerator opening angle and the engine revolution number NE at a given time.

In next step S324, referring is made to a map which beforehand stores a target throttle opening angle represented by target torque and engine revolution number NE used as variables, to retrieve target opening angle corresponding to both the target torque obtained in step S323 and engine revolution number at that time.

In step S325, electronically controlled throttle 104 is controlled based on the target opening angle.

When atmospheric pressure is low, the opening characteristic of intake valve 105 is fixed to the maximum lift and the maximum operation angle and the maximum retarded angle, while throttle opening angle is changed corresponding to a target torque (a target intake air amount) so as to generate the target torque by controlling intake air amount according to a throttle opening angle.

In such a condition in which the atmospheric pressure is low, if boost pressure is controlled to be adjusted to the target boost pressure by controlling the throttle opening angle while the intake air amount of engine 101 is controlled by controlling the opening characteristic of intake valve 105, generation of a required boost pressure (a negative pressure) necessary for operating fuel vapor processing unit 700, exhaust gas recirculation system 800, direct acting vacuum servo brake 900 and the like might fail or acquirement of a negative pressure effective for generating a required torque might result in failure.

In contrast, if the intake air amount of engine 101 is controlled by controlling the throttle opening angle, a negative pressure can be generated to a maximum angle in a low load range because the throttle opening angle is lessened corresponding to a reduction in a target torque (a target intake air amount). Consequently, the target torque as well as the boost pressure (the negative pressure) necessary for operating fuel vapor processing unit 700, exhaust gas recirculation system 800, direct acting vacuum servo brake 900 and the like can be easily generated.

Incidentally, even when the atmospheric pressure is low, the opening characteristic of intake valve 105 is not always required to be fixed.

A description of an embodiment in which the opening characteristic of intake valve 105 is not fixed when the atmospheric pressure is low will be provided hereinbelow.

Figure 14:
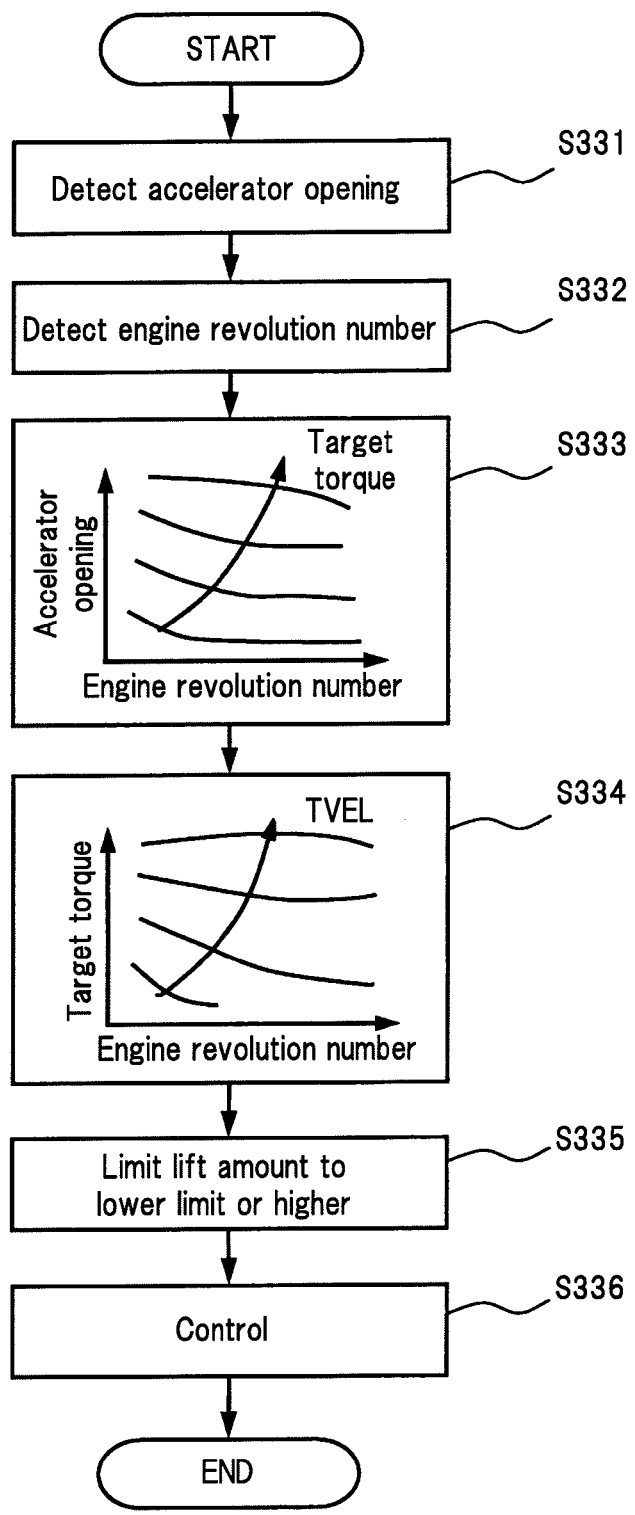
FIG. 14 is a flowchart of a second embodiment of the variable lift mechanism under conditions in which the atmospheric pressure is equal to or lower than the threshold value, according to the present invention.
Figure 15:
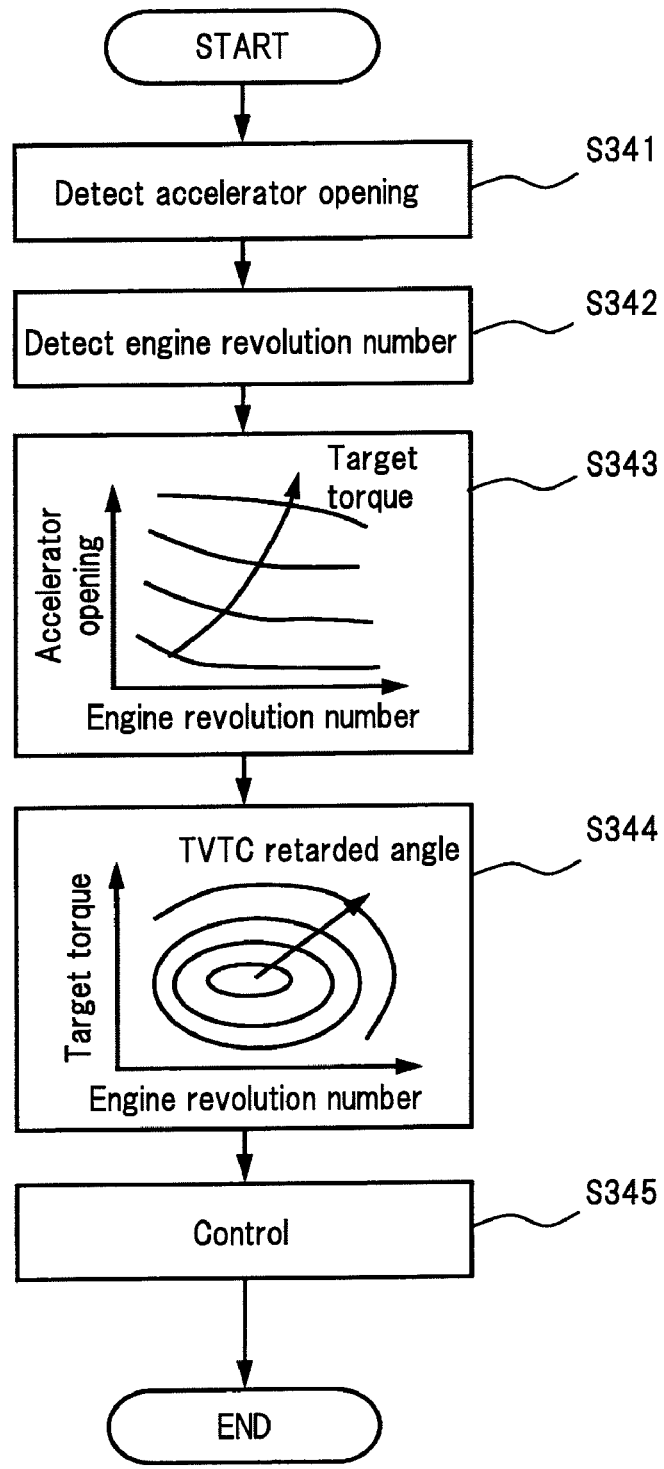
FIG. 15 is a flowchart of the second embodiment of control routine of the variable valve timing mechanism under conditions in which the atmospheric pressure is equal to or lower than the threshold value, according to the present invention.
Figure 16:
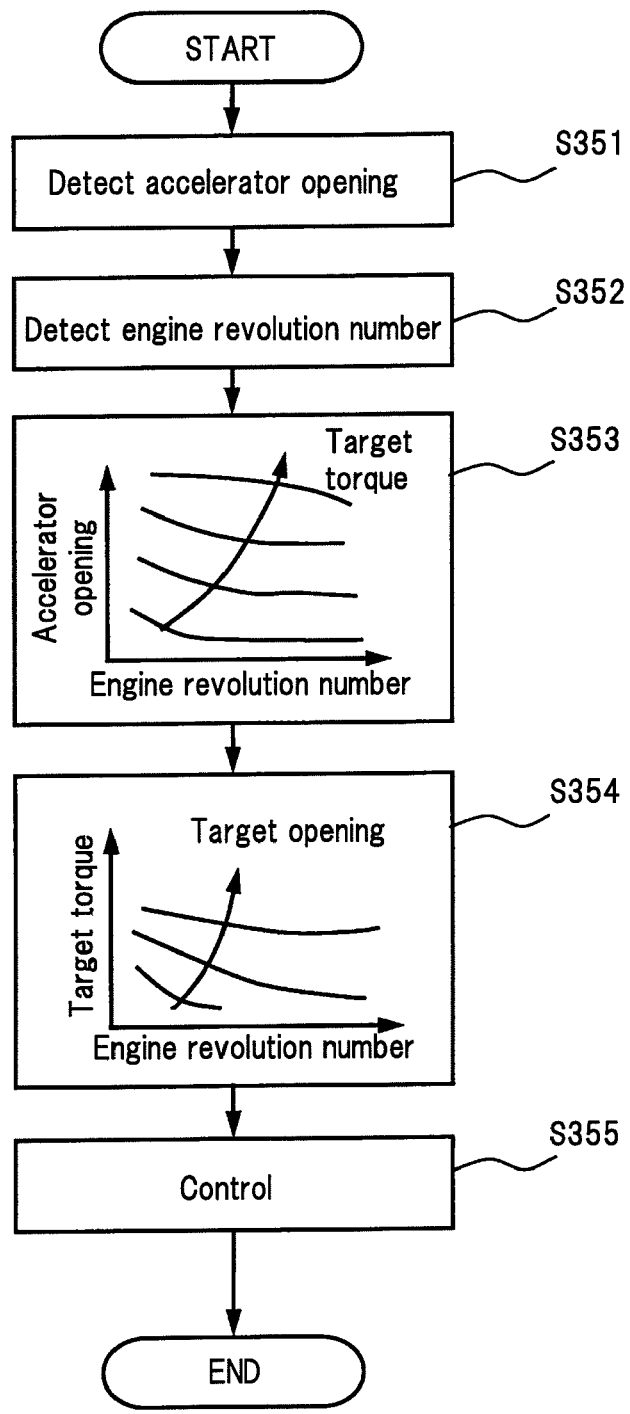
FIG. 16 is a flowchart of the second embodiment of control routine of the electronically controlled throttle under conditions in which the atmospheric pressure is equal to or lower than the threshold value, according to the present invention.

The flowcharts of FIGS. 14 through 16 illustrate a second embodiment of control routine when the atmospheric pressure is low with respect to a preset threshold value.

According to the second embodiment, target lift amount TVEL of intake valve 105 which is set corresponding to a target torque (a target intake air amount) is limited to an amount equal to or higher than its lower limit and the throttle opening angle is lessened by an amount corresponding to an increase in opening area of intake valve 105 due to that limitation, so that the intake air amount is eventually adjusted to the target intake air amount.

The lower limit is set as a lower limit of a valve lift amount, where a target boost pressure can be obtained when the throttle valve is choked to be completely closed while acquiring the target torque (the target intake air amount).

The flowchart of FIG. 14 shows the second embodiment of control routine of variable lift mechanism 112 when the atmospheric pressure is low.

In step S331, accelerator opening angle is detected based on output signal of accelerator opening angle sensor 116 and in next step S332, engine revolution number NE (rpm) is detected based on output signal of crank angle sensor 117.

Then, in step S333, referring is made to a map which beforehand stores target torque (target intake air amount) represented by the accelerator opening angle and the engine revolution number NE used as variable, to retrieve a target torque corresponding to the accelerator opening angle and the engine revolution number NE at that time.

In next step S334, referring is made to a map which beforehand stores target lift amount TVEL represented by the target torque and the engine revolution number as variables, to retrieve target lift amount TVEL corresponding to both the target torque obtained in step S333 and the engine revolution number NE at that time.

The processing described so far is substantially identical with processing of the normal control illustrated in the flowchart of FIG. 7.

In step S335, when target lift amount TVEL corresponding to both the target torque obtained in step S334 is lower than the preliminarily memorized lower limit, the lower limit is set as target lift amount TVEL.

In this way, valve lift amount of intake valve 105 can be prevented from being controlled to a low lift which is lower than the lower limit, so that it is controlled to be variable in a high lift area, which is equal to or higher than the lower limit.

In step S336, variable lift mechanism 112 is controlled based on target lift amount TVEL which is limited by the lower limit.

The flowchart of FIG. 15 shows the second embodiment of control routine of variable valve timing mechanism 113 when the atmospheric pressure is low.

In step S341, accelerator opening angle is detected based on output signal from accelerator opening angle sensor 116.

In step S342, engine revolution number NE (rpm) is detected according to output signal from crank angle sensor 117.

In step S343, referring is made to a map which beforehand stores a target torque (a target intake air amount) represented by the accelerator opening angle angle and the engine revolution number NE used as variables, to retrieve the target torque (the target intake air amount) corresponding to the accelerator opening angle and the engine revolution number NE at the given time.

In step S344, referring is made to a map which beforehand stores target advance angle amount TVTC represented by the target torque and the engine revolution number NE used as variables, to retrieve the target advance angle amount TVTC corresponding to both the target torque obtained in step S343 and the engine revolution number at that time.

In step S345, variable valve timing mechanism 113 is controlled based on the target advance angle amount TVTC.

The above-described processing is the same as the control routine of variable valve timing mechanism 113 at a normal time (a high pressure time) shown in the flowchart of FIG. 8, except that the intake air amount is adjusted to an amount larger than the target intake air amount by controlling valve lift amount so as to be limited to an amount equal to or higher than the lower limit thereof, and then, throttle opening angle is throttled and lessened to thereby adjust the intake air amount to the target intake air amount which corresponds to the target torque.

The flowchart of FIG. 16 shows the second embodiment of control routine of electronically controlled throttle 104 when the atmospheric pressure is low.

In step S351, an accelerator opening angle is detected based on output signal from accelerator opening angle sensor 116.

In step S352, engine revolution number NE (rpm) is detected based on output signal of crank angle sensor 117.

In step S353, referring is made to a map which beforehand stores target torque represented by the accelerator opening angle and the engine revolution number NE used as variables, to retrieve target torque (target intake air amount) corresponding to the accelerator opening angle and the engine revolution number NE at that current time.

In step S354, referring is further made to a map which beforehand stores target opening angle of the electronically controlled throttle represented by the target torque and the engine revolution number NE used as variables, to retrieve a target opening angle thereof corresponding to both the target torque obtained in step S353 and the engine revolution number at that moment of time.

In step S355, electronically controlled throttle 104 is controlled based on the target opening angle thereof obtained by the retrieving.

A map of target opening angle which is referred in the step S354 is set in a manner that the throttle opening angle is lessened by throttling in an area corresponding to such an area where a target lift amount TVEL which is lower than the lower limit is set on the map of target lift amount TVEL referred to in the step S334.

That is, in the area where the lower limit is employed as the target lift amount TVEL due to the fact that target lift amount TVEL is below the lower limit, an actual valve lift amount is controlled to become larger than that corresponding to a target torque, and as a result, an intake air amount is undesirably more than that corresponding to the target torque.

In order to avoid this inconvenience, excessive intake air amount, which is caused by the larger valve lift amount compared to an appropriate lift amount corresponding to the target torque, is reduced to a proper target intake air amount by lessening the throttle opening angle.

Thus, when the throttle opening angle is lessened by throttling to reduce the excessive intake air amount with respect to a desired intake air amount corresponding to the target torque, the desired negative pressure can be produced. Consequently, like the first embodiment shown in FIGS. 11 through 13, the target torque as well as the boost pressure (the negative pressure) necessary for operating fuel vapor processing unit 700, exhaust gas recirculation system 800, direct acting vacuum servo brake 900 and the like can be surely obtained.

Figure 17:
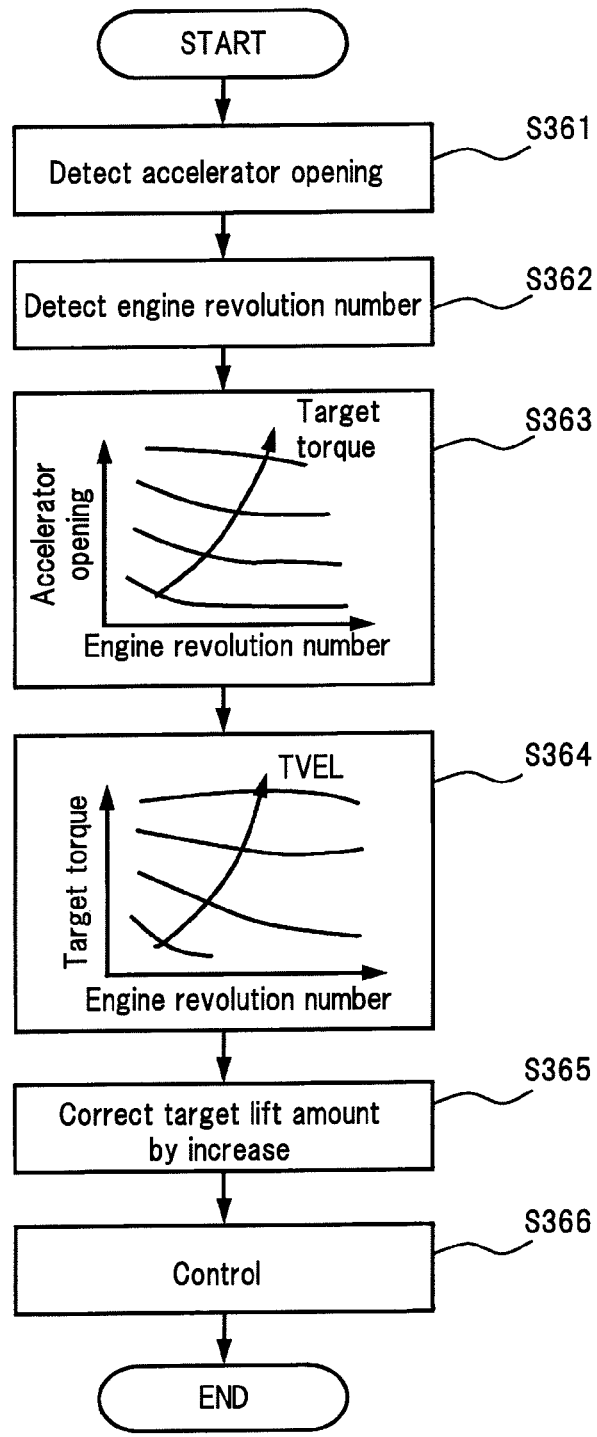
FIG. 17 is a flowchart of a third embodiment of control routine of the variable lift mechanism under conditions in which the atmospheric pressure is equal to or lower than the threshold value, according to the present invention.
Figure 18:
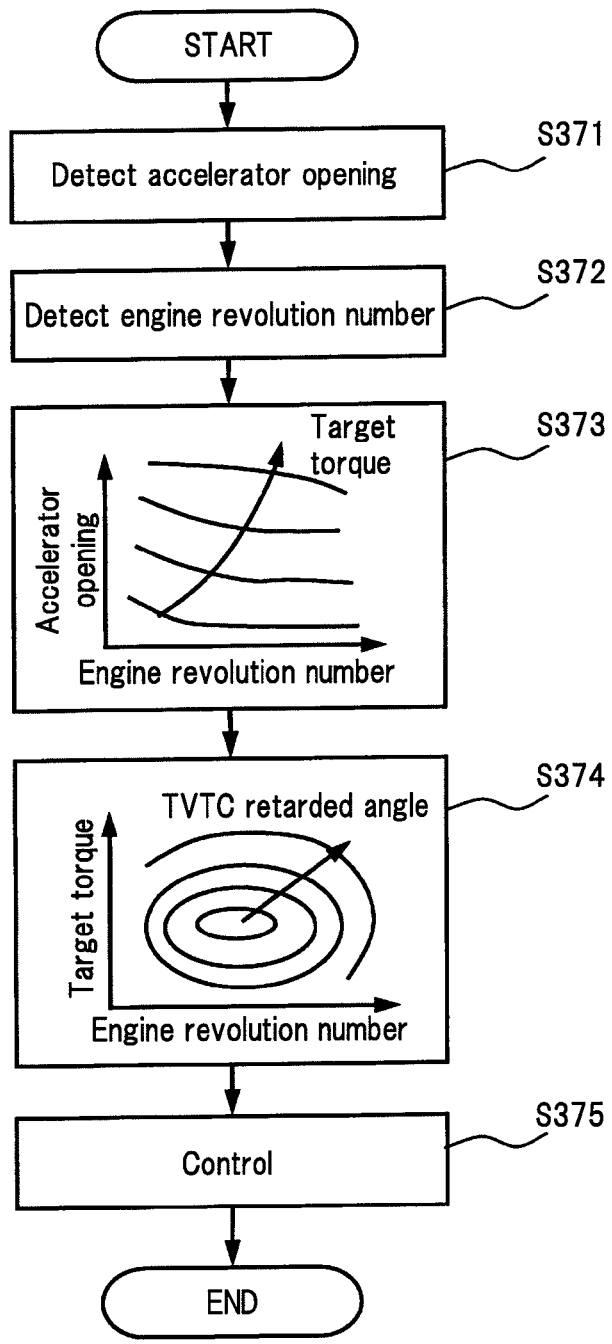
FIG. 18 is a flowchart of the third embodiment of control routine of the variable valve timing mechanism under conditions in which the atmospheric pressure is equal to or lower than the threshold value, according to the present invention.
Figure 19:
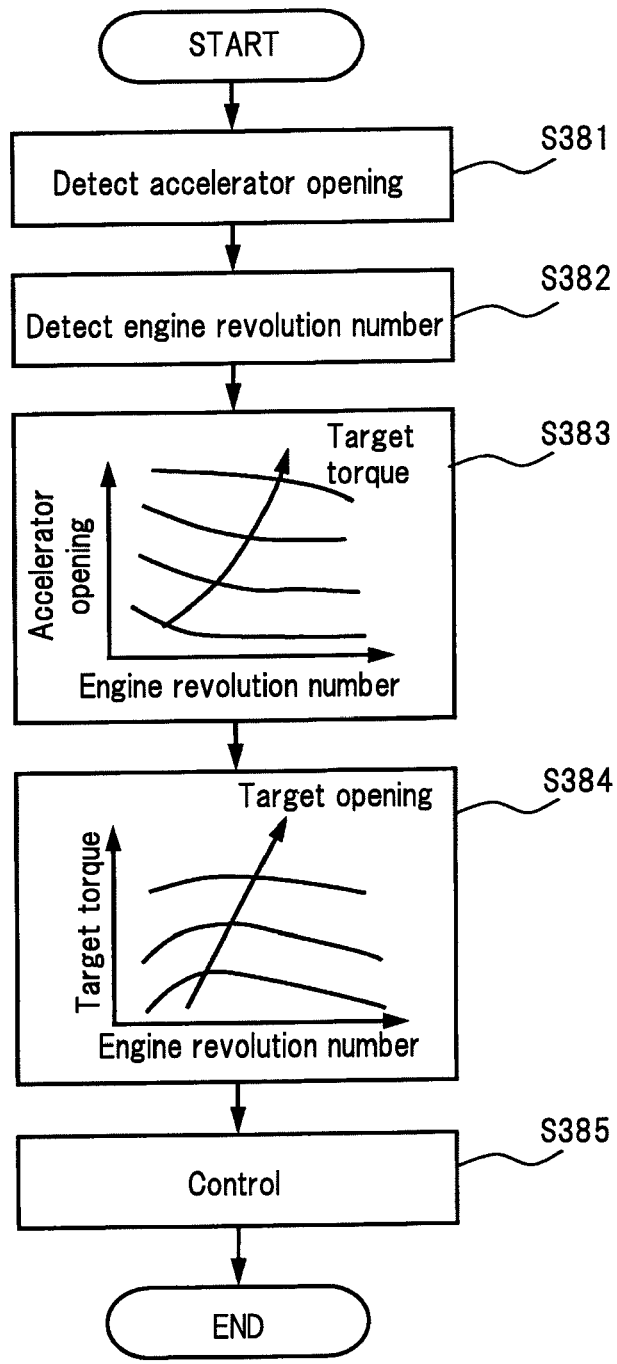
FIG. 19 is a flowchart of the third embodiment of control routine of the electronically controlled throttle under conditions in which the atmospheric pressure is equal to or lower than the threshold value, according to the present invention.

The flowcharts of FIGS. 17 through 19 provide an explanation of a third embodiment of control routine when the atmospheric pressure is low with respect to a preset threshold value.

The flowchart of FIG. 17 shows the control routine of variable lift mechanism 112 under a condition where the atmospheric pressure is equal to or lower than the preset threshold value, according to the third embodiment.

In step S361, accelerator opening angle is detected based on output signal from accelerator opening angle sensor 116.

In step S362, engine revolution number NE (rpm) is detected based on output signal of crank angle sensor 117.

In step S363, referring is made to a map which beforehand stores target torque (target intake air amount) represented by the accelerator opening angle and the engine revolution number NE used as variables, to retrieve a target torque (a target intake air amount) corresponding to the accelerator opening angle and the engine revolution number NE at the current time.

In next step S364, referring is now made to a map which beforehand stores target lift amount TVEL represented by the target torque and the engine revolution number NE used as variables, to retrieve target lift amount TVEL corresponding to both the target torque obtained in step S363 and the engine revolution number NE at this moment of time.

The processing described so far is the same as the normal control of variable lift mechanism 112 shown in FIG. 7.

In step S365, to target lift amount TVEL obtained in step S364, a correction value is uniformly added, and the resulted valve lift amount is regarded as final target lift amount TVEL.

That is, a valve lift amount larger than target lift amount TVEL which corresponds to target torque is set as a target amount.

At this stage, the correction value for correcting target lift amount TVEL can be set based on a negative pressure detected by negative pressure sensor 908.

In step S366, variable lift mechanism 112 is controlled based on target lift amount TVEL which is increased by the correction performed by an amount corresponding to the correction value.

The flowchart of FIG. 18 shows the control routine of variable valve timing mechanism 113 under a condition where the atmospheric pressure is equal to or lower than the preset threshold value, according to the third embodiment.

In step S371, accelerator opening angle is detected based on output signal from accelerator opening angle sensor 116.

In step S372, engine revolution number NE (rpm) is detected based on output signal of crank angle sensor 117.

In step S373, referring is made to a map which beforehand stores target torque (target intake air amounts) represented by the accelerator opening angle and the engine revolution number NE used as variables, to retrieve a target torque corresponding to the accelerator opening angle and the engine revolution number at the current time.

In step S374, referring is further made to a map which beforehand stores target advance angle amount TVTC represented by the target torque and the engine revolution number NE used as variables, to retrieve target advance angle amount TVTC corresponding to both the target torque obtained in step S373 and the engine revolution number NE at that moment of time.

In step S375, variable valve timing mechanism 113 is controlled based on the retrieved target advance angle amount TVTC.

The above-described processing is the same as the control routine of variable valve timing mechanism 113 at normal time shown in the flowchart of FIG. 8.

The flowchart of FIG. 19 shows the control routine of electronically controlled throttle 104 under a condition where the atmospheric pressure is equal to or lower than the preset threshold value, according to the third embodiment.

In step S381, accelerator opening angle is detected based on output signal of accelerator opening angle sensor 116.

In step S382, engine revolution number NE (rpm) is detected based on output signal of crank angle sensor 117.

In step S383, referring is made to a map which beforehand stores target torque represented by the accelerator opening angle and the engine revolution number NE used as variables, to retrieve a target torque (a target intake air amount) corresponding to the accelerator opening angle and the engine revolution number NE at the current time.

In next step S384, referring is further made to a map which beforehand stores target opening angles of the electronically controlled throttle represented by the target torque and the engine revolution number NE used as variables, to retrieve a a target opening angle of the electronically controlled throttle corresponding to both the target torque obtained in step S383 and the engine revolution number NE at that moment of time.

In step S385, electronically controlled throttle 104 is controlled based on the target opening angle.

As described above, when target lift amount TVEL is uniformly increased by the correction, since the valve lift amount is controlled to be adjusted to target lift amount TVEL which is larger than valve lift amount corresponding to the target torque, the intake air amount increases compared with a desired target intake air amount comparable to the target torque.

Therefore, the map of target opening angles which is referred to in the step S384 is set in such a manner that the excessive intake air amount caused by the correction which increases the target lift amount is reduced to an appropriate intake air amount comparable to the target torque by lessening throttle opening angle.

Further, when the throttle opening angle is lessened so as to reduce the excessive intake air amount with respect to a desired intake air amount corresponding to the target torque, the desired negative pressure can also be produced at the same time. Consequently, like the first embodiment shown in FIGS. 11 through 13, the target torque as well as the desired boost pressure (the negative pressure) necessary for operating fuel vapor processing unit 700, exhaust gas recirculation system 800, direct acting vacuum servo brake 900 and the like can be obtained.

In other words, by correcting target lift amount TVEL in an increasing manner and by choking the throttle valve in order to offset an amount of the intake air which is increased by the correction, rate of the intake air amount which is lessened by intake valve 105 is reduced whereas that lessened by the throttle valve is increased, so that the negative pressure can be increased, and consequently, the target negative pressure can be surely generated.

The entire contents of Japanese Patent Application No. 2006-355267, filed on Dec. 28, 2006 and Japanese Patent Application No. 2007-329012, filed on Dec. 20, 2007 are incorporated herein by reference.

While only selected embodiments have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention is provided for illustration only, and not for the purpose of limiting the invention as defined by the appended claims and their equivalents.

We claim:

1. An intake air control apparatus for an engine having a variable valve unit capable of varying opening characteristic of an intake valve and an electronically controlled throttle provided in an intake pipe on an upstream side of the intake valve, comprising:

a target intake air amount computing section that computes a target intake air amount of the engine corresponding to a operating condition of the engine;

an atmospheric pressure detecting section that detects an atmospheric pressure;

a first control section that controls the variable valve unit in a manner such that the intake air amount of the engine is adjusted to become the target intake air amount, when the atmospheric pressure exceeds a threshold value; and a second control section that controls the opening characteristic of the intake valve in a manner such that the intake air amount of the engine becomes larger than the air intake amount controlled by the first control section, and controls the electronically controlled throttle in a manner such that the intake air amount of the engine becomes the target intake air amount, when the atmospheric pressure does not exceed the threshold value.

2. The intake air control apparatus for the engine according to claim 1, wherein the first control section:

reduces an opening angle of the electronically controlled throttle smaller than a full opening thereof under such a specified operating condition of the engine that a boost pressure is required to be negative pressure, and holds the opening angle of the electronically controlled throttle at the full opening thereof under an operating condition of the engine except for the specified condition; and controls the variable valve unit in a manner such that the intake air amount of the engine is brought to the target intake air amount under a given boost pressure condition.

3. The intake air control apparatus for the engine according to claim 1, wherein the second control section:

corrects the opening characteristic of the intake valve corresponding to the target intake air amount toward a state where the intake air amount more increases; and offsets an amount of the intake air that is increased by the correction relative to the target intake air amount by reducing the opening angle of the electronically controlled throttle.

4. The intake air control apparatus for the engine according to claim 1, wherein the first control section comprises:

a target pressure computing section configured to compute a target boost pressure based on the target intake air amount;

a first valve control section configured to compute a target value of the variable valve unit necessary for bringing the intake air amount of the engine to the target intake air amount under a condition of the computed target boost pressure and to control the variable valve unit based on the target value thereof;

a boost pressure detector configured to detect the boost pressure of the engine; and a first throttle control section configured to control the electronically controlled throttle based on the boost pressure detected by the boost pressure detector and the target boost pressure.

5. The intake air control apparatus for the engine according to claim 1, wherein the second control section comprises:

a second valve control section configured to control the variable valve unit to thereby fix the opening characteristic of the intake valve to a standard opening characteristic thereof;

a target opening angle computing section configured to compute a target opening angle of the electronically controlled throttle based on the target intake air amount of the engine; and a second throttle control section configured to control the electronically controlled throttle based on the target opening angle thereof computed by the target opening angle computing section.

6. The intake air control apparatus for the engine according to claim 5, wherein the variable valve unit comprises a variable lift mechanism capable of continuously varying the operation angle and a lift amount of the intake valve, and wherein the second valve control section is configured to control the variable lift mechanism so that the operation angle is fixed to a maximum value of a variable range.

7. The intake air control apparatus for the engine according to claim 6, wherein the variable valve unit comprises a variable valve timing mechanism for varying a center phase of the operation angle of the intake valve together with the variable lift mechanism, and the second valve control section controls the variable lift mechanism so that the operation angle is fixed to a maximum value in a variable range thereof and controls the variable valve timing mechanism so that the center phase of the operation angle is fixed to a maximum retarded angle position of a variable range thereof.

8. The intake air control apparatus for the engine according to claim 1, wherein the second control section comprises:

a target value computing section configured to compute a target value of the variable valve unit, which is used for bringing the intake air amount of the engine to the target intake air amount;

a target limiting section configured to receive the target value computed by the target value computing section upon being inputted therein and, under a condition such that said target value is a value that allows the intake air amount to become smaller than when a given limiting value is used as a target value, to set the given limiting value as the target value to be outputted therefrom;

a second valve control section configured to control the variable valve unit based on the target value outputted from the target limiting section; and a second throttle control section configured, when the given limiting value is used as the target value instead of the target value computed by the target value computing section, to reduce the opening angle of the electronically controlled throttle to thereby bring the intake air amount of the engine to the target intake air amount.

9. The intake air control apparatus for the engine according to claim 8, wherein the variable valve unit comprises a variable lift mechanism for continuously varying the operation angle and a lift amount of the intake valve, and the target limiting section limits the target value of the variable lift mechanism so that the operation angle and the lift amount of the intake valve become equal to or larger than a given limit value thereof, respectively.

10. The intake air control apparatus for the engine according to claim 1, wherein the second control section comprises:

a target value computing section configured to compute a target value of the variable valve unit, which is used for allowing the intake air amount of the engine to be brought to the target intake air amount;

a correcting section configured to correct the target value computed by the target value computing section so that the intake air amount of the engine increase;

a second valve control section configured to control the variable valve unit based on the target value corrected by the correcting section; and a second throttle control section configured to reduce the opening angle of the electronically controlled throttle to thereby offset an amount of the intake air that is increased by the correcting section relative to the target intake air amount to thereby bring the intake air amount of the engine to the target intake air amount.

11. A method of controlling an engine intake air of an engine having a variable valve unit capable of varying opening characteristic of an intake valve and an electronically controlled throttle provided in an intake pipe on an upstream side of the intake valve, comprising the steps of:

computing a target intake air amount of the engine corresponding to a operating condition of the engine;

detecting an atmospheric pressure;

controlling the variable valve unit so that the intake air amount of the engine is brought to the computed target intake air amount, when the detected atmospheric pressure exceeds a threshold value thereof; and controlling the opening characteristic of the intake valve to become a state thereof where the intake air amount of the engine more increases than when the atmospheric pressure exceeds a threshold value thereof and controlling the electronically controlled throttle so that the intake air amount of the engine is brought to the target intake air amount, when the atmospheric pressure does not exceed the threshold value.

12. The method according to claim 11, wherein when the atmospheric pressure exceeds the threshold value, the step for controlling the variable valve unit and electronically controlled throttle comprises the steps of:

reducing an opening angle of the electronically controlled throttle relative to a full opening thereof under a specified operating condition in which a boost pressure to the engine is required to become a negative pressure;

holding the opening angle of the electronically controlled throttle in the full opening thereof under an operating condition except for the specified condition; and controlling the variable valve unit so that the intake air amount of the engine is brought to the target intake air amount under the specified condition for the boost pressure.

13. The method according to claim 11, wherein when the atmospheric pressure does not exceed the threshold value, the step for controlling the variable valve unit and electronically controlled throttle comprises the steps of:

correcting the opening characteristic of the intake valve corresponding to the target intake air amount toward a state where the intake air amount more increases; and offsetting an amount of the intake air that is increased by the correcting step relative to the target intake air amount by reducing the opening angle of the electronically controlled throttle.

14. The method according to claim 11, wherein when the atmospheric pressure exceeds the threshold value, the step for controlling the variable valve unit and the electronically controlled throttle comprises the steps of:

computing a target boost pressure of the engine based on the target intake air amount;

computing a target value of the variable valve unit so that the intake air amount of the engine is brought to the target intake air amount under a condition of the target boost pressure computed by the computing step;

controlling the variable valve unit based on the target value;

detecting a boost pressure of the engine; and controlling the electronically controlled throttle based on the boost pressure detected by the boost pressure detecting step and the target boost pressure computed by the computing step.

15. The method according to claim 11, wherein when the atmospheric pressure does not exceed the threshold value, the step for controlling the variable valve unit and electronically controlled throttle comprises the steps of:

controlling the variable valve unit so as to fix the opening characteristic of the intake valve to a standard opening characteristic thereof;

computing a target opening angle of the electronically controlled throttle based on the target intake air amount; and controlling the electronically controlled throttle based on the target opening angle computed by the computing step.

16. The method according to claim 15, wherein the variable valve unit is provided with a variable lift mechanism capable of continuously varying the operation angle and a lift amount of the intake valve, and the step of fixing the opening characteristic of the intake valve to the standard opening characteristic comprises the step of controlling the variable lift mechanism so that the operation angle of the intake valve is fixed to a maximum value in a variable range thereof.

17. The method according to claim 16, wherein the variable valve unit is provided with a variable valve timing mechanism for varying a center phase of the operation angle of the intake valve together with the variable lift mechanism, and the step of fixing the opening characteristic of the intake valve to the standard opening characteristic comprises the steps of:

controlling the variable lift mechanism so that the operation angle is fixed to a maximum value in a variable range thereof; and controlling the variable valve timing mechanism so that the center phase of the operation angle is fixed to a maximum retarded angle position of the variable range thereof.

18. The method according to claim 11, wherein when the atmospheric pressure does not exceed the threshold value, the step of controlling the variable valve unit and electronically controlled throttle comprises the steps of:

computing a target value of the variable valve unit, which is used for bringing the intake air amount of the engine to the target intake air amount;

setting the given limiting value as the target value, under a condition such that said target value is a value that allows the intake air amount to become smaller than when a given limiting value is used as a target value;

controlling the variable valve unit based on the target value limited by the limiting value; and reducing the opening angle of the electronically controlled throttle to thereby control the intake air amount of the engine to bring to the target intake air amount, when the target value corresponding to the target intake air amount is replaced with the limiting value.

19. The method according to claim 18, wherein the variable valve unit comprises a variable lift mechanism for continuously varying the operation angle and a lift amount of the intake valve, and the step of limiting the target value comprises the step of limiting the target value of the variable lift mechanism so that the operation angle and the lift amount of the intake valve become equal to or larger than a given limit value thereof, respectively.

20. The method according to claim 11, wherein when the atmospheric pressure does not exceed the threshold value, the step of controlling the variable valve unit and the electronically controlled throttle comprises the steps of:

computing a target value of the variable valve unit, which is used for allowing the intake air amount of the engine to be brought to the target intake air amount;

correcting the target value so that the intake air amount of the engine increase;

controlling the variable valve unit based on the corrected target value; and reducing the opening angle of the electronically controlled throttle to thereby offset an amount of the intake air that is increased by the correcting step relative to the target intake air amount to thereby control the intake air amount of the engine to be brought to the target intake air amount.

21. An intake air control apparatus for an engine having a variable valve unit capable of varying opening characteristic of an intake valve and electronically controlled throttle provided in an intake pipe on an upstream side of the intake valve, comprising:

a target intake air amount computing means for computing a target intake air amount of the engine corresponding to a operating condition of the engine;

an atmospheric pressure detecting means for detecting atmospheric pressure;

a first control means for controlling the variable valve unit in a manner such that the intake air amount of the engine is adjusted to become the target intake air amount, when the atmospheric pressure exceeds a threshold value; and a second control means for controlling the opening characteristic of the intake valve in a manner such that the intake air amount of the engine becomes larger than the intake air amount controlled by the first control means, and controlling the electronically controlled throttle in a manner such that the intake air amount of the engine becomes the target intake air amount, when the atmospheric pressure does not exceed the threshold value.

* * * * *